(12) United States Patent
Nelms et al.

(10) Patent No.: US 10,489,840 B2
(45) Date of Patent: Nov. 26, 2019

(54) SYSTEM, METHOD, AND NON-TRANSITORY COMPUTER-READABLE STORAGE MEDIA RELATED TO PROVIDING REAL-TIME PRICE MATCHING AND TIME SYNCHRONIZATION ENCRYPTION

(71) Applicant: Wal-Mart Stores, Inc., Bentonville, AR (US)

(72) Inventors: David Martin Nelms, Rogers, AR (US); Eytan Daniyalzade, San Francisco, CA (US); Berk Atikoglu, San Francisco, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 685 days.

(21) Appl. No.: 15/004,624

(22) Filed: Jan. 22, 2016

(65) Prior Publication Data

US 2017/0213271 A1 Jul. 27, 2017

(51) Int. Cl.
| | |
|---|---|
| *G06Q 30/00* | (2012.01) |
| *G06Q 30/06* | (2012.01) |
| *G06Q 30/02* | (2012.01) |
| *G07G 1/00* | (2006.01) |
| *G06Q 20/12* | (2012.01) |

(Continued)

(52) U.S. Cl.
CPC ......... *G06Q 30/0629* (2013.01); *G06Q 20/12* (2013.01); *G06Q 20/201* (2013.01); *G06Q 20/325* (2013.01); *G06Q 20/3223* (2013.01); *G06Q 20/3224* (2013.01); *G06Q 20/3274* (2013.01); *G06Q 20/3276* (2013.01); *G06Q 20/387* (2013.01); *G06Q 20/401* (2013.01); *G06Q 20/4012* (2013.01);

(Continued)

(58) Field of Classification Search
CPC .............. G06Q 30/00; G06Q 30/0601; G06Q 30/0623; G06Q 30/0641
See application file for complete search history.

(56) References Cited

U.S. PATENT DOCUMENTS

| | | | |
|---|---|---|---|
| 5,226,519 | A | 7/1993 | Dewoolfson |
| 5,642,279 | A | 6/1997 | Bloomberg et al. |

(Continued)

FOREIGN PATENT DOCUMENTS

| | | |
|---|---|---|
| WO | 1996001454 | 1/1996 |
| WO | 1997046985 | 12/1997 |

(Continued)

OTHER PUBLICATIONS

Gao, Jerry, et al. "A 2D barcode-based mobile payment system." 2009 Third International Conference on Multimedia and Ubiquitous Engineering. IEEE, 2009. (Year: 2009).*

(Continued)

*Primary Examiner* — Christopher B Seibert
(74) *Attorney, Agent, or Firm* — Bryan Cave Leighton Paisner LLP

(57) ABSTRACT

Techniques related to retail transaction are disclosed. The techniques involve comparing the prices associated with a customer order with the prices being charged by competitors prior to the transaction being completed. The customer is given the opportunity to apply a credit based on the difference in prices being charged by the retailer and competitors, to the transaction.

20 Claims, 15 Drawing Sheets

(51) Int. Cl.
*G06Q 20/32* (2012.01)
*G06Q 20/38* (2012.01)
*G06Q 20/40* (2012.01)
*G06Q 20/20* (2012.01)

(52) U.S. Cl.
CPC ....... *G06Q 30/0283* (2013.01); *G07G 1/0036* (2013.01); *G07G 1/0081* (2013.01)

(56) References Cited

U.S. PATENT DOCUMENTS

| | | | |
|---|---|---|---|
| 5,873,069 A | 2/1999 | Reuhl et al. | |
| 5,883,968 A | 3/1999 | Welch | |
| 6,016,480 A | 1/2000 | Houvener | |
| 6,076,070 A | 6/2000 | Stack | |
| 6,311,178 B1* | 10/2001 | Bi | G06Q 30/06 707/706 |
| 6,732,081 B2 | 5/2004 | Nicholson | |
| 6,811,030 B1 | 11/2004 | Compton | |
| 6,912,507 B1 | 6/2005 | Phillips et al. | |
| 7,069,240 B2 | 6/2006 | Spero et al. | |
| 7,082,415 B1 | 7/2006 | Robinson et al. | |
| 7,099,833 B1 | 8/2006 | Sundaresan | |
| 7,107,225 B1 | 9/2006 | McClung, III | |
| 7,198,192 B2 | 4/2007 | Page et al. | |
| 7,200,576 B2 | 4/2007 | Steeves et al. | |
| 7,455,226 B1 | 11/2008 | Hammond | |
| 7,580,860 B2 | 8/2009 | Junger | |
| 7,580,873 B1 | 8/2009 | Silver et al. | |
| 7,606,731 B2 | 10/2009 | McClung, III | |
| 7,657,470 B1 | 2/2010 | Delurgio et al. | |
| 7,660,738 B1 | 2/2010 | Siegel et al. | |
| 7,740,172 B1 | 6/2010 | Hubert et al. | |
| 7,746,510 B2 | 6/2010 | Pandipati | |
| 7,783,515 B1 | 8/2010 | Kumar et al. | |
| 7,792,709 B1 | 9/2010 | Trandal et al. | |
| 7,865,427 B2 | 1/2011 | Wright et al. | |
| 7,881,991 B2 | 2/2011 | Darrell | |
| 8,006,900 B2 | 8/2011 | Grigsby et al. | |
| 8,027,439 B2 | 9/2011 | Zoldi et al. | |
| 8,046,260 B2 | 10/2011 | Haddad et al. | |
| 8,108,287 B2 | 1/2012 | Kirch et al. | |
| 8,160,984 B2 | 4/2012 | Hunt et al. | |
| 8,175,918 B2 | 5/2012 | Cooper et al. | |
| 8,180,682 B2 | 5/2012 | Narayanaswami et al. | |
| 8,249,916 B2 | 8/2012 | Gworek | |
| 8,346,634 B2 | 1/2013 | Shiftan | |
| 8,352,382 B1* | 1/2013 | Katta | G06Q 50/28 705/330 |
| 8,356,750 B2 | 1/2013 | Hammond | |
| 8,448,859 B2 | 5/2013 | Goncalves | |
| 8,458,010 B1 | 6/2013 | Geoffrin et al. | |
| 8,494,909 B2 | 7/2013 | Goncalves | |
| 8,498,974 B1* | 7/2013 | Kim | G06F 16/9535 707/706 |
| 8,511,574 B1 | 8/2013 | Yen et al. | |
| 8,615,422 B1 | 12/2013 | Alkasimi et al. | |
| 8,793,760 B2 | 7/2014 | Raper | |
| 10,032,185 B2 | 7/2018 | Waffa et al. | |
| 2001/0056386 A1* | 12/2001 | O'Halloran | G06F 11/2289 705/28 |
| 2002/0052756 A1 | 5/2002 | Lomangino | |
| 2002/0055912 A1* | 5/2002 | Buck | G06Q 20/3821 705/76 |
| 2002/0069118 A1 | 6/2002 | Zylstra | |
| 2002/0077937 A1* | 6/2002 | Lyons | G06Q 10/087 705/28 |
| 2002/0198772 A1 | 12/2002 | Bates et al. | |
| 2004/0088230 A1 | 5/2004 | Elliott | |
| 2005/0160014 A1 | 7/2005 | Moss et al. | |
| 2005/0240525 A1 | 10/2005 | Bagayatkar | |
| 2005/0240535 A1 | 10/2005 | Grooms | |
| 2005/0246225 A1 | 11/2005 | Jorgensen | |
| 2006/0015403 A1 | 1/2006 | McClung, III | |
| 2006/0074762 A1* | 4/2006 | Heising | G06Q 30/06 705/26.8 |
| 2006/0261160 A1 | 11/2006 | Gamer | |
| 2007/0011172 A1* | 1/2007 | Ruul | G06Q 30/00 |
| 2007/0021973 A1 | 1/2007 | Stremier | |
| 2007/0073592 A1 | 3/2007 | Perry et al. | |
| 2007/0078725 A1* | 4/2007 | Koszewski | G06Q 30/0271 705/14.67 |
| 2007/0094087 A1 | 4/2007 | Mitchell | |
| 2007/0112730 A1* | 5/2007 | Gulli | G06F 16/951 |
| 2007/0174073 A1 | 7/2007 | Hunscher | |
| 2007/0174144 A1* | 7/2007 | Borders | G06Q 10/0631 705/26.81 |
| 2007/0208598 A1* | 9/2007 | McGrady | G06F 19/3462 705/3 |
| 2007/0265914 A1 | 11/2007 | McClung, III | |
| 2008/0005017 A1 | 1/2008 | Poster | |
| 2008/0065514 A1* | 3/2008 | Eaton | G06Q 10/087 705/26.3 |
| 2008/0073429 A1 | 3/2008 | Oesterling et al. | |
| 2008/0078828 A1* | 4/2008 | Helmin | G06F 19/328 235/375 |
| 2008/0086411 A1 | 4/2008 | Olson | |
| 2008/0140576 A1 | 6/2008 | Lewis et al. | |
| 2008/0149725 A1 | 6/2008 | Rosenbaum | |
| 2008/0201226 A1 | 8/2008 | Carlson et al. | |
| 2008/0255951 A1 | 10/2008 | Miller et al. | |
| 2009/0018965 A1 | 1/2009 | Neydavood | |
| 2009/0048934 A1 | 2/2009 | Haddad | |
| 2009/0138358 A1 | 5/2009 | Gonen | |
| 2009/0138398 A1* | 5/2009 | Cole | G06Q 20/02 705/42 |
| 2009/0164333 A1* | 6/2009 | Rothman | G06Q 10/08 705/26.1 |
| 2009/0234848 A1* | 9/2009 | Leff | G06F 16/951 |
| 2009/0271265 A1 | 10/2009 | Lay | |
| 2009/0299887 A1 | 12/2009 | Shiran et al. | |
| 2009/0327062 A1 | 12/2009 | Botes | |
| 2010/0042488 A1 | 2/2010 | McClung, III | |
| 2010/0138281 A1* | 6/2010 | Zhang | G06Q 10/087 705/28 |
| 2010/0169361 A1* | 7/2010 | Chen | G06F 16/285 707/769 |
| 2010/0306080 A1 | 12/2010 | Trandal et al. | |
| 2011/0066483 A1 | 3/2011 | Salmon et al. | |
| 2011/0131102 A1* | 6/2011 | Wang | G06Q 20/10 705/16 |
| 2011/0225098 A1 | 9/2011 | Wolff | |
| 2011/0307318 A1 | 12/2011 | LaPorte et al. | |
| 2012/0018501 A1 | 1/2012 | Wilen | |
| 2012/0045083 A1* | 2/2012 | Lin | H04R 1/10 381/380 |
| 2012/0078682 A1 | 3/2012 | Pinsley et al. | |
| 2012/0078739 A1 | 3/2012 | Maraz | |
| 2012/0095618 A1* | 4/2012 | Lo | H04N 21/41407 701/2 |
| 2012/0095853 A1* | 4/2012 | von Bose | G06Q 20/20 705/16 |
| 2012/0143722 A1 | 6/2012 | John | |
| 2012/0221430 A1 | 8/2012 | Naghmouchi et al. | |
| 2012/0271759 A1 | 10/2012 | Lee | |
| 2012/0323663 A1 | 12/2012 | Leach | |
| 2013/0030898 A1 | 1/2013 | Burton | |
| 2013/0054433 A1 | 2/2013 | Giard et al. | |
| 2013/0066698 A1 | 3/2013 | Levy et al. | |
| 2013/0170507 A1* | 7/2013 | Hsueh | H04L 63/0428 370/503 |
| 2013/0246143 A1 | 9/2013 | Hunt | |
| 2013/0317896 A1* | 11/2013 | Liberty | G06Q 30/0222 705/14.23 |
| 2014/0032061 A1 | 1/2014 | Wulf et al. | |
| 2014/0058938 A1 | 2/2014 | McClung, III | |
| 2014/0074665 A1 | 3/2014 | Stewart | |
| 2014/0095350 A1* | 4/2014 | Carr | G06Q 10/083 705/26.8 |
| 2014/0097237 A1 | 4/2014 | Delfer | |
| 2014/0108272 A1 | 4/2014 | Mayo | |
| 2014/0122325 A1 | 5/2014 | Zoldi et al. | |

(56) References Cited

U.S. PATENT DOCUMENTS

| | | | |
|---|---|---|---|
| 2014/0172697 A1 | 6/2014 | Ward et al. | |
| 2014/0201037 A1 | 7/2014 | Mallawarachchi et al. | |
| 2014/0304059 A1* | 10/2014 | Wang .................. | G06Q 30/0234 705/14.34 |
| 2016/0148300 A1 | 5/2016 | Carr et al. | |
| 2017/0193542 A1 | 7/2017 | Rapaka et al. | |

FOREIGN PATENT DOCUMENTS

| | | |
|---|---|---|
| WO | 1999064979 | 12/1999 |
| WO | 2012131401 | 10/2012 |
| WO | 2013159152 | 10/2013 |

OTHER PUBLICATIONS

Utility U.S. Appl. No. 14/549,266, filed Nov. 20, 2014 entitled "System, Method, and Non-Transitory Computer-Readable Storage Media for Allowing a Customer to Place Orders Remotely and to Pick-Up the Order at a Store".

Utility U.S. Appl. No. 14/985,981, filed Dec. 31, 2015 entitled "System, Method, and Non-Transitory Computer-Readable Storage Media for Evaluating Search Results in a Price Comparison System".

Data Warehousing, Academic Press, 2001, chapter(s) 7-9 2001.
Algorithms+Data Structures=Programs, 1976, pp. xii-55 1976.
HCI remixed: reflections on works that have influenced the HCI community, MIT Press, 2008, pp. 275-279 2008.
Why a Diagram is (Sometimes) Worth Ten Thousand Words, Larkin, Simon, Congnitive Science, 1987, pp. 65-100 1987.
Streetlights and Shadows, MIT Press, 2009, pp. 33-47 2009.
The future of the internet—and how to stop it, Yale University Press, 2008, Chapter(s) 1-9, [emphasis pp. 11-18] 2008.
Database Management System, Himalaya Publishing House, 2008, chapter(s) 2-3; prior art used in this Office Action 2008.
Advanced Artificial Intelligence, Shi, World Scientific, 2011, pp. 430-458 2011.
Data Mining, Elsevier, Han and Kamber, 2006, pp. 234-274 2006.
Microsoft Computer Dictionary, Fifth Edition, 2002, Microsoft Press, p. 23 2002.
Mind—A Brief Introduction, John R. Searle, 2004, Oxford University Press, pp. 62-67 2004.
What is Thought, Eric baum, The MIT Press, 2004, pp. 33-65 2004.
Robotics, Science and Systems III, WOlfram Burgard, Oliver Brock, and Cyrill Stachniss, The MIT Press, 2008, pp. 41-48 2008.
Language and Mind, Chomsky, Oxford University Press, 2005, p. 62 2005.
Computing the Mind, Shimon Edelman, Oxford University Press, 2008, pp. 26-31 2008.
Noetics, Lawrence Krader, 2010, Peter Lang Publishing, pp. 551-553 2010.
Britannica Concise Encyclopedia, Encyclopedia Britannica, 2006, p. 537 2006.

* cited by examiner

SYSTEM, METHOD, AND NON-TRANSITORY COMPUTER-READABLE STORAGE MEDIA RELATED TO PROVIDING REAL-TIME PRICE MATCHING AND TIME SYNCHRONIZATION ENCRYPTION

FIELD OF THE DISCLOSURE

The present invention relates to an online transactional processing system, and more specifically, to a system, method and computer program configured to provide real-time price matching. The suggested class/subclass of the disclosure is: CLASS 707/607 (DATA PROCESSING: DATABASE, DATA MINING AND FILE MANAGEMENT OR DATA STRUCTURES/Online Transactional Processing (OLTP) and the suggested Art Unit is 2161.

BACKGROUND

Generally, retail establishments currently allow a customer to shop for items or goods, place the items in a cart or basket, check-out and pay for items by using a traditional cashier who scans each item and then receives tender from the customer for payment of the items. Historically, tender or payment for the items or goods was in the form of cash or a check, or some form of credit, e.g., through use of a credit card. Use of such forms of tender raises security issues, as well, in practice may be cumbersome.

In some instances, it is very important that customers receive the lowest possible price on items for sale and that customers are aware that the prices at the retailer provide the best deal. For customers, it is likewise important to find the best possible deal on purchases. For both the retailer and the customer, it can be difficult to evaluate pricing. Competitors may transmit advertisements on various media, and publish advertisements and coupons in various publications. A customer must therefore wade through all of these for all items in order to find the best deal. Once found, price matching may enable a customer to buy all items at the same store, rather than visit various retail stores. However, the time spent in reviewing advertisements each week is nonetheless inconvenient.

The systems and methods disclosed herein provide an improved approach for a retailer to ensure that prices paid by a customer are competitive and to ensure that the customer is aware of savings obtained by shopping at a retailer.

The present invention is aimed at one or more of the problems identified above.

SUMMARY OF THE INVENTION

In different embodiments of the present invention, systems, methods, and computer-readable storage media allow customers to utilize a mobile device, such as a cell phone, to authorize payment for a customer order.

In one embodiment, a system having a first database and a sale computer system is provided. The first database is configured to store a plurality of goods and a customer account associated with a customer of a retailer. The customer account includes the customer identification number and a method of payment. The sale computer system is configurable to communicate with the database and to receive a customer order associated with the customer. The customer order includes a list of goods to be purchased, the customer identification number, and a total cost of the customer order. The sale computer system is configured to access the customer account in the database as a function of the customer identification number and to process the customer order by: (a) for each one of the goods on the customer order, sending a price for the associated good to a price comparison system and responsively receiving an indication of credit from the price comparison system, (b) aggregating any credit associated with all of the goods in the list of goods to be purchased, (c) sending, to a customer control device, on a mobile device associated with the customer, a request to apply the aggregated credit to the customer order, and (d) in response to the customer approving application of the aggregated credit, modifying the total cost of the customer order as a function of the aggregated credit.

In other embodiments, a method includes the step of storing, in a first database, a plurality of goods and a customer account associated with a customer of a retailer. The customer account includes the customer identification number and a method of payment. The method also includes the step of receiving, at a sale computer system, a customer order associated with the customer. The customer order includes a list of goods to be purchased, the customer identification number, and a total cost of the customer order. For each one of the goods on the customer order, a price for the associated good is sent to a price comparison system and an indication of credit from the price comparison system is responsively received. The credit is responsive to a difference between the price of the associated good at the retailer and pricing information of the associated good with at least one other retailer. The method further includes the steps of aggregating any credit associated with all of the goods in the list of goods to be purchased, sending, to a customer control device, on a mobile device associated with the customer, a request to apply the aggregated credit to the customer order, and in response to the customer approving application of the aggregated credit, and modifying the total cost of the customer order as a function of the aggregated credit.

In still other embodiments, one or more non-transitory computer-readable storage media, have computer-executable instructions embodied thereon. When executed by at least one processor, the computer-executable instructions cause the at least one processor to store, in a database, a plurality of goods and a customer account associated with a customer of a retailer. The customer account includes a customer identification number and a method of payment. A customer order associated with the customer is received. The customer order includes a list of goods to be purchased, the customer identification number, and a total cost of the customer order. For each one of the goods on the customer order, a price for the associated good is sent to a price comparison system and an indication of credit from the price comparison system is received. The credit is responsive to a difference between the price of the associated good at the retailer and pricing information of the associated good with at least one other retailer. Any credit associated with all of the goods in the list of goods to be purchased is aggregated. A request to apply the aggregated credit to the customer order is sent to a customer control device. In response to the customer approving the application of the aggregated credit, the total cost of the customer order is modified as a function of the aggregated credit.

BRIEF DESCRIPTION OF THE FIGURES

Other advantages of the present disclosure will be readily appreciated, as the same becomes better understood by reference to the following detailed description when considered in connection with the accompanying drawings wherein.

Non-limiting and non-exhaustive embodiments of the present invention are described with reference to the following figures, wherein like reference numerals refer to like parts throughout the various views unless otherwise specified.

Figure 1:
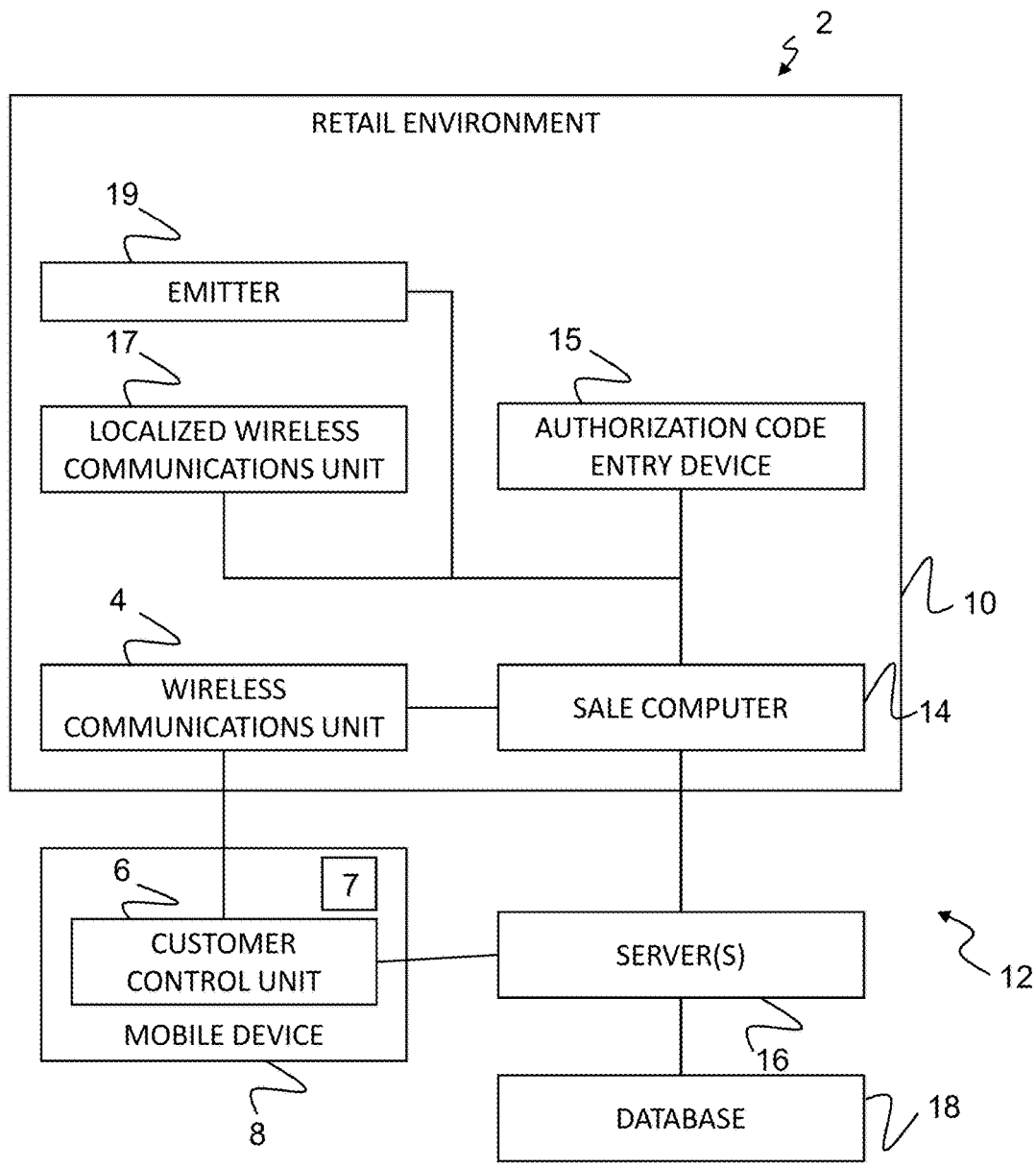
FIG. 1 is a diagrammatic illustration of a system for use in a retail transaction according to the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis.

The disclosure particularly describes how a customer may order or select goods for purchase and at check-out receive a request to apply a credit, received from a price comparison system, to the current transaction. Particularly, the present disclosure describes systems, methods and computer programs associated with a retail environment that allows a customer to apply a price matching credit for a customer order.

With reference to the FIGS. and in operation, in one aspect of the present invention provides an online transactional processing system 2, methods and computer product media that facilitate the order and/or tendering of payment of an order for a customer. The order may have been placed online, remotely or may have been assembled by the customer at a retail environment 10. The retail environment 10 may be a retail store, a specified location at which the customer may pick-up of the order, and/or a delivery vehicle 32 (see FIG. 3) that delivers an assembled order to the customer.

Referring to FIG. 1, a high-level exemplary environment 20 in which the system 2 operates is illustrated. A customer may desire to purchase items from a facility or retail store at a specified location, such as a store. The store may be representative of a larger corporate environment which may provide many avenues of interface with a customer. In a modern shopping environment, a store may include both one or more brick and mortar retail locations and an on-line retail location. In some situations, a customer may not desire to go to the store or may not have sufficient time to go to the store. Alternatively, the customer may desire that the order be delivered to their home location, business location, or some other location. In situations, the retail environment 10 may be the delivery vehicle or centered about the delivery vehicle.

With reference to FIG. 1, system 2 includes a sale computer system 12 to facilitate the processing of the customer order. In one embodiment, the sale computer system 12 may be a stand-alone computer that is located at the retail environment 10. Alternatively, the sale computer system 12 may include a sale computer 14 located at the retail environment 10 and one or more servers 16 which is generally located remotely. A database 18 may be used to store customer account information, customer order information, and information related to the retail environment 10 (see below). The sale computer system 12 or the server 16 may access the data stored on the database 18. For example, the database 18 may include a plurality of customer accounts. Each customer account has an associated customer identification, e.g., an identification number. The sale computer 14 may access the customer accounts to running a query against the database based on customer identification number.

In some embodiments, a customer control unit 6 communicates with the sale computer 14 with a wireless communications unit 4. The wireless communications unit 4 may be, e.g., a wireless router or wireless access point that provides a wireless network (wireless network or Wi-Fi). In general, the customer control unit 6 is embodied in a software application or "app" that is run by the mobile device 8.

The mobile device 8 may be the customer's cell phone. In some embodiments, the mobile device 8 may communicate with the sale computer system 12 (or the server 16) over the cellular data network.

System for Processing Online Orders for Delivery or Pickup

As stated above, the customer may travel to the retail environment 10, i.e., a store, assemble the order and go to a checkout station to pay for the customer order. Alternatively the he customer may desire to order items from the store 20 (see FIG. 2) and have the items (or goods) delivered to a customer location 22 such as the customer's residence, business, etc. . . . Alternatively, the customer may desire to pick-up the order from the store 20.

For clarity in discussing the various function of the system 2, multiple computers and/or servers are discussed as performing different functions in delivering goods to a customer. These different computers (or servers) may, however, be implemented in multiple different ways such as modules within a single computer, as nodes of a computer system, etc. . . . The functions performed by the system 2 (or nodes or modules) may be centralized or distributed in any suitable manner across the system 2 and its components, regardless of the location of specific hardware. Furthermore, specific components of the system 2 may be referenced using functional terminology in their names. The function terminology is used solely for purposes of naming convention and to distinguish one element from another in the following discussion. Unless otherwise specified, the name of an element conveys no specific functionality to the element or component.

Figure 2:
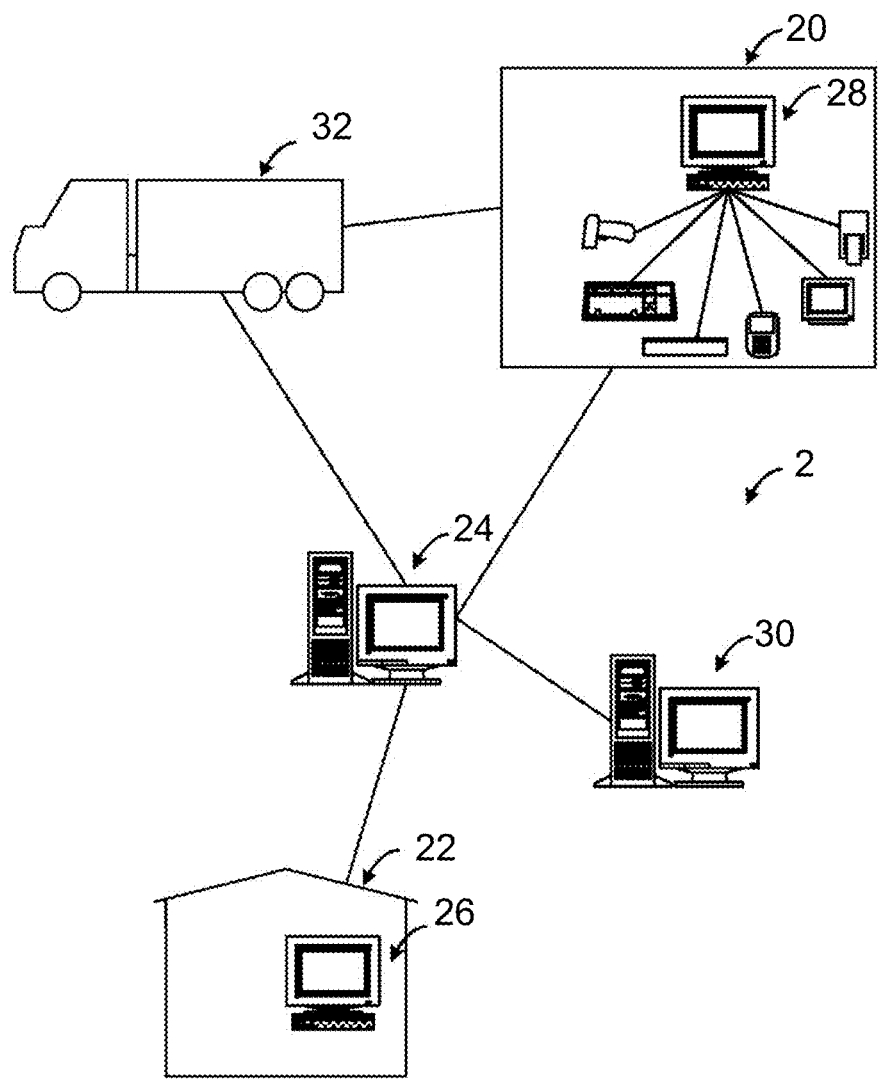
FIG. 2 is a schematic illustrating various aspects of a system according to the present disclosure.

With reference to FIG. 2, an exemplary system 2 that allows the customer to order goods online and have the order assembled at the retail location 10 for pickup or have the goods delivered is shown. The system 2 may include or have an associated first server 24. The first server 24 may host a store webpage which allows a customer to, via a customer device 26, interact with the store 20 and first server 24 to place an order for one or more items or goods from the store 20. Alternatively, the first server 24 may communicate and interact directly with the customer device 26 via appropriate software applications or apps running on the first server 24 and the customer device 26.

The first server 24 may include a database of items which are for sale within the store 20 with information relevant to these items. The first server 24 may include software to allow delivery of items to a customer or to facilitate pick-up of the items from the store 20 by the customer. Particularly, the first server 24 may provide an internet webpage to allow a customer to select items, select or enter delivery or pick-up information, and purchase the items in a virtual shopping environment. The first server 24 may communicate with other computers, servers, or components of the system 10 to deliver the items to the customer or to arrange for pick-up of the items.

The system 10 may also include a second server 28. The second server 28 may interact with the store 20 and assist the store employees in picking items for orders and assembling the order.

The system 10 may also include a third server 30. The third server 30 may manage delivery routes for a delivery service 32 which delivers goods to a customer. The third server 30 may determine when, during a day, there is sufficient time to deliver an order to the customer and may provide information to the first server 24 to allow the store server to provide customized information to the customer during the ordering process to allow the customer to select a desired delivery window which may be fulfilled by the store 20 and delivery service 32.

A customer purchasing items from the store 20 for delivery to a customer location 22 or pick-up at a store 20 will typically view an internet webpage or access an application or app corresponding to the store. The customer may have an account with the store or merchant and may sign into the system 2, e.g., at the first server 24. A customer account may include information about the customer such as name, address, past purchase history, etc. The webpage or app may display to the customer items at the store 20 which are available for pick-up or delivery. Not all items may be available for pick-up (at a specific or selected store) or for delivery. The customer may select items or goods for purchase. In signing into an account or entering information for a purchase, the first server 24 may receive (from the customer) customer information which facilitates delivery of goods to the customer. Particularly, the first server 24 may receive the address of the customer location 22 where purchased items are to be delivered. Alternatively, the first server 24 may receive a customer selection of a store 20 at which the customer desires to pick-up the order as well as a customer motor vehicle license plate number.

The first server 24 may provide customer information, such as the address of the customer location 22, to the third server 30. The third server 30 may use the customer information to determine time periods during the day when a delivery service 32 may deliver the items to the customer. The third server 30 may manage multiple delivery trucks/routes throughout the day for the delivery service 32 and may determine how much time a delivery truck has available and how much time is required to deliver the items to the customer location 22. The third server 30 may determine when during the day a delivery truck (or other delivery service) may deliver the items to the customer. The third server 30 may provide information regarding when the delivery service 32 is able to deliver items to the customer location 22 to the first server 24.

Figure 3:
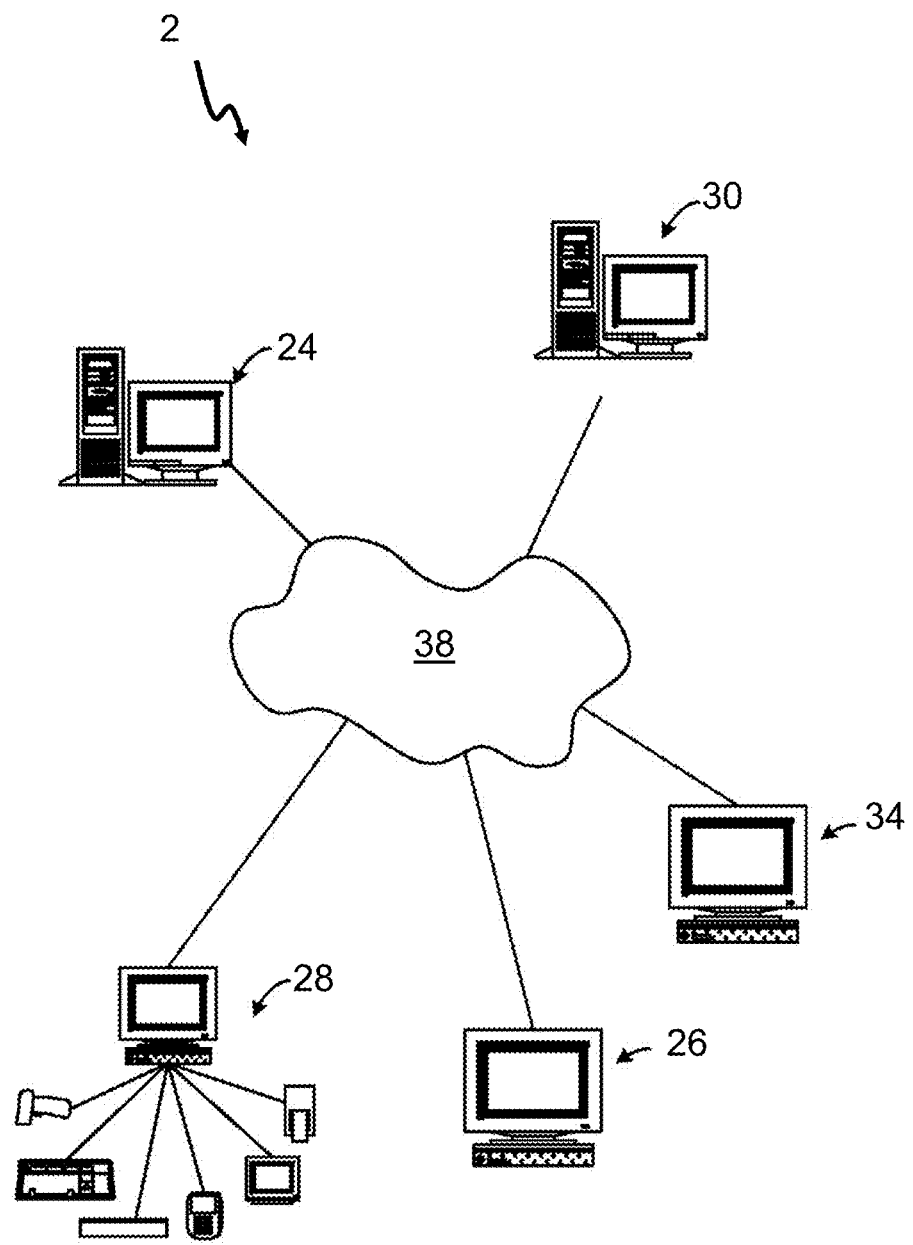
FIG. 3 is a schematic illustrating a portion of the system of FIG. 1 in context of order fulfillment and delivery, according to an embodiment of the present invention.

Referring to FIG. 3, in selected embodiments, the software, hardware, and associated components of the system 10 may be programmed and configured to implement one or more embodiments described herein. A customer may communicate with the first server 24 via the customer device 26 and a communications connection or network 38 to select items for purchase. The first server 24 may also communicate with a third server 30, delivery service 32, and second server 28 via a communications connection. The communications connection may be any suitable connection, including the Internet, file transfer protocol (FTP), an Intranet, LAN, a virtual private network (VPN), cellular networks, etc. . . . , and may utilize any suitable or combination of technologies including, but not limited to wired and wireless connections, always on connections, connections made periodically, and connections made as needed.

The customer device 26 may include any suitable device, including, but not limited to, a desktop computer, a laptop or notebook computer, a tablet, a handheld mobile device including a cellular telephone, and the like.

Referring to FIG. 3, in selected embodiments, the hardware, software, or hardware and software of first server 24, the second server 28, and the third server 30 may be configured to receive and utilize item information as described herein, performing functions associated with the first server 24 and second server 28. The second server 28 may communicate with the customer device 26, a delivery service computer 34, and a store handheld device 36 via a communications connection or network 38. In this manner, the various aspects of the system may be exemplified as software, modules, nodes, etc. of a store computer or second server 28.

Figure 4:
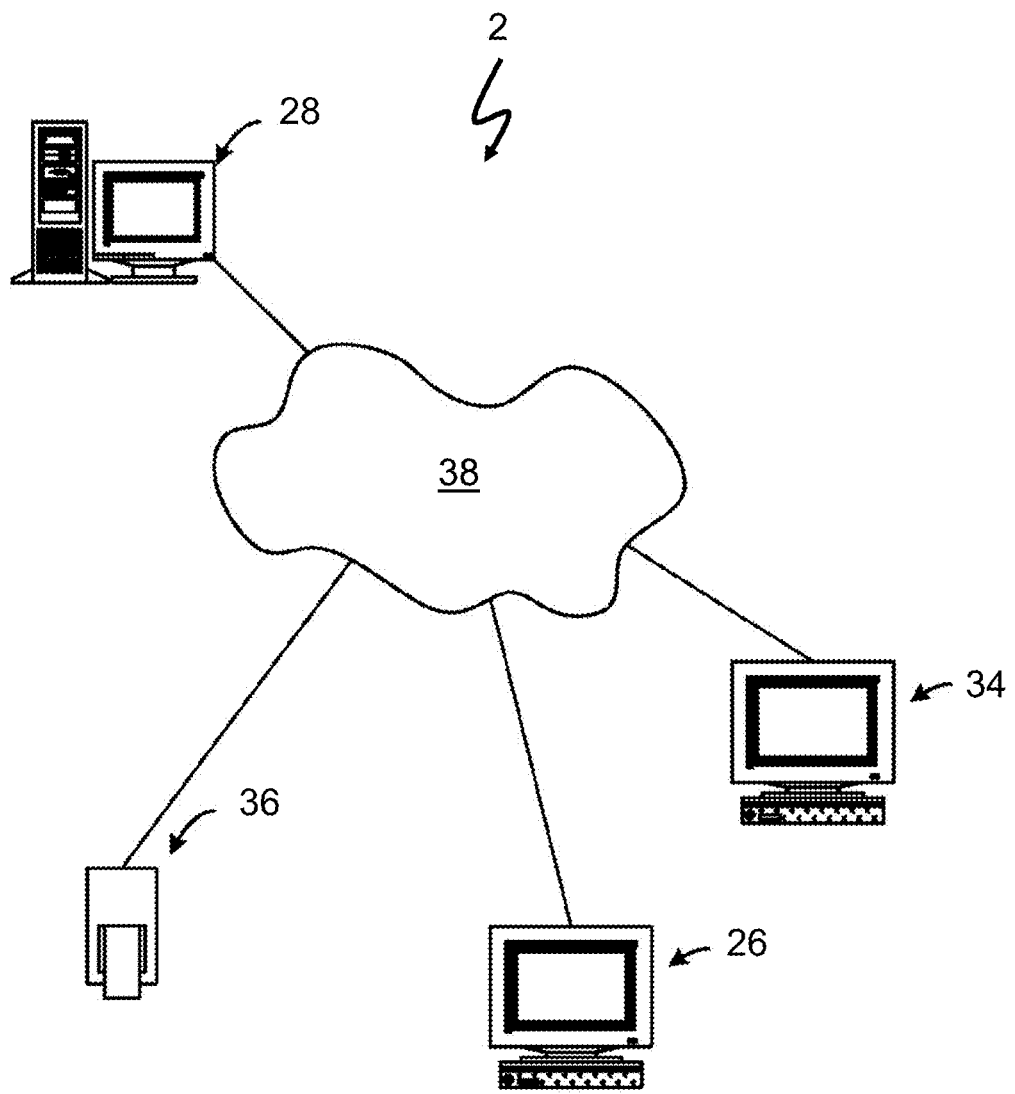
FIG. 4 is a second schematic illustrating a portion of the system of FIG. 1 in context of order fulfillment and delivery, according to an embodiment of the present invention.
Figure 5:
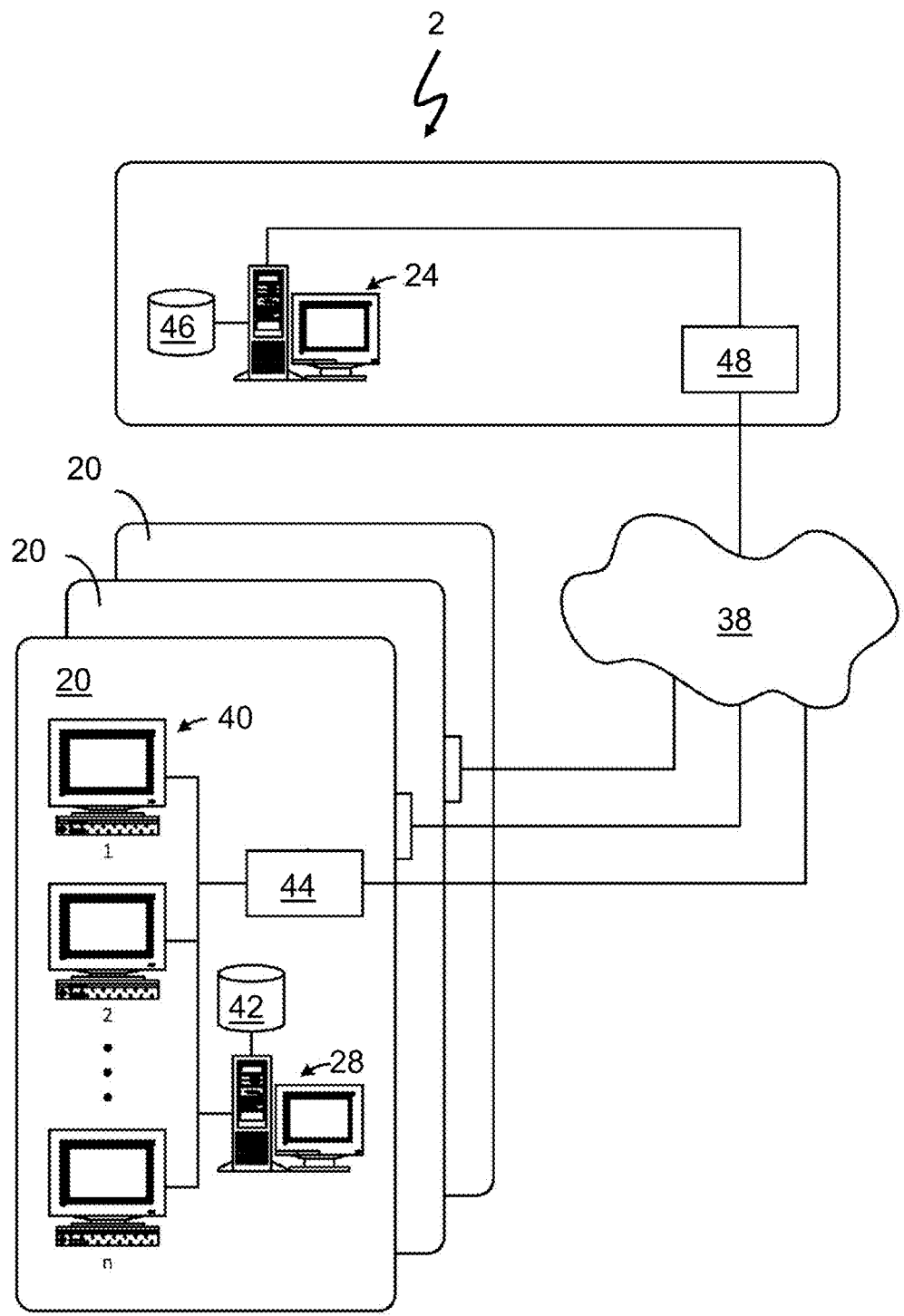
FIG. 5 is a schematic illustrating the system of FIG. 1 in a multiple store environment, according to an embodiment of the present invention.

Referring to FIG. 4, in selected embodiments, the system 2 may operate substantially independently, as a stand-alone unit. Alternately, a store system 2 may operate as a larger system (see FIG. 5). For example, multiple stores 20 may operate at different locations (e.g., different brick-and-mortar stores, facilities, and/or warehouses). In such embodiments, each local system may have a second server 28 as well as other computers or handheld devices 40, database and data storage devices 42, and networking devices 44 as necessary. Each local system may be connected to the first server 24 via a network or internet connection 38. The first server 24 may be associated with database and data storage devices 46 and a network device 48 as necessary.

One embodiment of the system 2 and the assembly of the order for pickup and/or the delivery of the orders to the customer location 22 using the delivery service 32 is described within commonly owned U.S. Patent Application Publication No. 2014/0095350, published Apr. 3, 2014, and U.S. patent application Ser. No. 14/549,266, filed on Nov. 20, 2014, both of which are hereby incorporated by reference.

Figure 6:
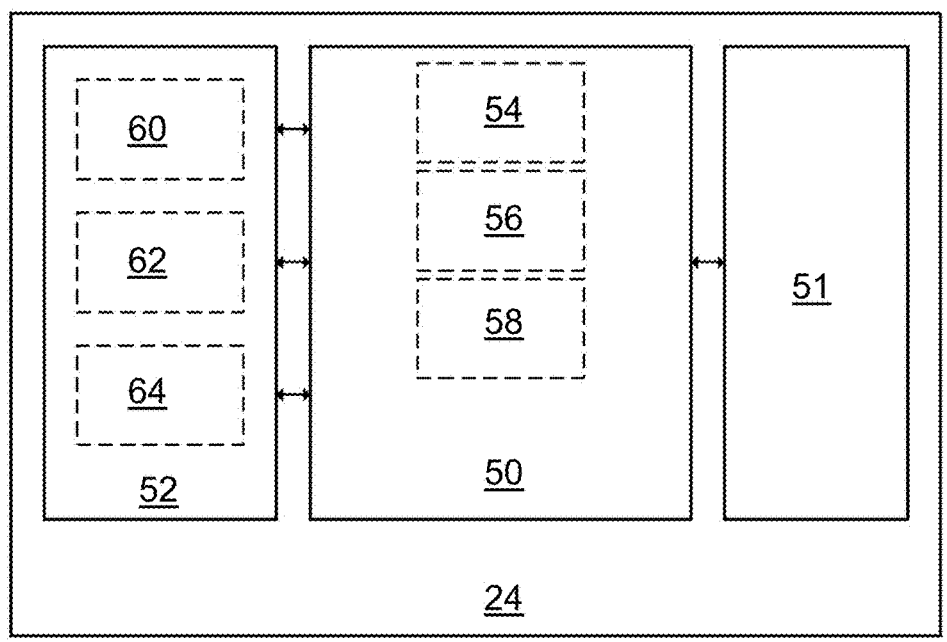
FIG. 6 is an illustration of an exemplary screenshot from the system of FIG. 1, according to an embodiment of the present invention.

As referenced above, the server 16 and the first server 24 may be the same server or may work together to perform the associated functions. The server 16, 24 may be configured to perform one or more functions associated with receiving an order from a customer, managing the delivery or pick-up of the customer orders, and streamlining the collection of items for customer orders. FIG. 6 illustrates an example of the server 16, 24 configured to perform one or more of the requested functions. In the illustrated embodiment, the server 16, 24 may include a processing device 50, a communication device 51, and a memory device 52.

The processing device 50 can include memory, e.g., read only memory (ROM) and random access memory (RAM), storing processor-executable instructions and one or more processors that execute the processor-executable instructions. In embodiments where the processing device 90 includes two or more processors, the processors can operate in a parallel or distributed manner. In an example, the processing device 50 may execute a web or application module 54, a delivery module 56, and an order fulfillment module 58.

The communication device 51 is a device that allows the first server 24 to communicate with another device, e.g., the customer device 26, delivery service computer 34, etc. The communication device 51 can include one or more wireless transceivers for performing wireless communication and/or one or more communication ports for performing wired communication.

The memory device 52 is a device that stores data generated or received by the first server 24. The memory device 52 can include, but is not limited to a hard disc drive, an optical disc drive, and/or a flash memory drive. Further, the memory device 52 may be distributed and located at multiple locations. The memory device 52 is accessible to the processing device 90. In some embodiments, the memory device 94 stores a customer database 60, an item database 62, and a delivery database 64.

In some examples, the customer database 60 can store information associated with a customer. The customer database 60 may, for example, store information associated with a customer account and may include account preferences and customer contact information. The customer database 60 may also store information regarding a customer delivery address as well as specific details regarding delivery of items to the delivery address. The customer database 60 may be queried by the processing device 50 and may provide information to the processing device to facilitate receiving an order from a customer and delivering an order to the customer.

In some examples, the item database 62 stores item information associated with items or types of items in the store 20. For example, the item database 62 may store identification codes, UPC codes, item location in the store 20, as well as other information associated with the items. By way of example, the item database 62 may be queried by the processing device 50 and may transmit information to the processing device to facilitate the use of item data.

In some examples, the delivery database 64 stores information to facilitate delivery of customer orders to a customer location 22. The delivery database 64 may store information regarding a map of a delivery area or an area around a store 20, street and traffic information for a delivery area, delivery routes, and transit times associated with a delivery area, etc.

The processing device 50 may execute the web or application module 54. The web or application module 54 may present a store interface and item information to a customer, receive customer information and order information, and otherwise handle the purchase transaction with a customer as described herein. The processing device 50 may also execute a delivery module 56. The delivery module may receive customer delivery address information from the web or application module 54 and may determine customer location, compare location with existing delivery routes, determine available delivery times, schedule deliveries, create delivery routes, and otherwise manage delivery of customer orders. The web or application module 54 may receive potential delivery times from the delivery module 56 and present these potential delivery times to a customer to allow the customer to select a delivery window for their order. The processing device 50 may further close orders for a delivery route, finalize the delivery route, and interface with a delivery service 32 to deliver orders to customers.

The processing device 50 may execute an order fulfillment module 58. The order fulfillment module 58 may receive customer order information for a delivery route and may facilitate the collection of items from a store to fulfill the customer orders. The order fulfillment module 58 may combine orders together, arrange items according to a predetermined picking order through a store 20, and direct a store employee through the store 20 to collect items for the customer orders.

Customer Self-Check Out

In other embodiments of the present invention, the customer or user can use the mobile device 8, e.g., a cell phone to self-checkout at a store by identifying products or goods the customer places into their basket or cart as the customer is shopping. The user can input identification information into the mobile device which identifies the item for purchase, generate an order for the item identified by the identification information and pay for the order without having to remove each item from a shopping cart and scan the item at a traditional cashier or a self-checkout station. In this manner, a user can save time by not having to remove items from a shopping cart for scanning at a traditional cashier or a self-checkout station, and the user can save additional time by bypassing the traditional cashier or self-checkout station completely and paying for an order directly with the mobile device.

Figure 7:
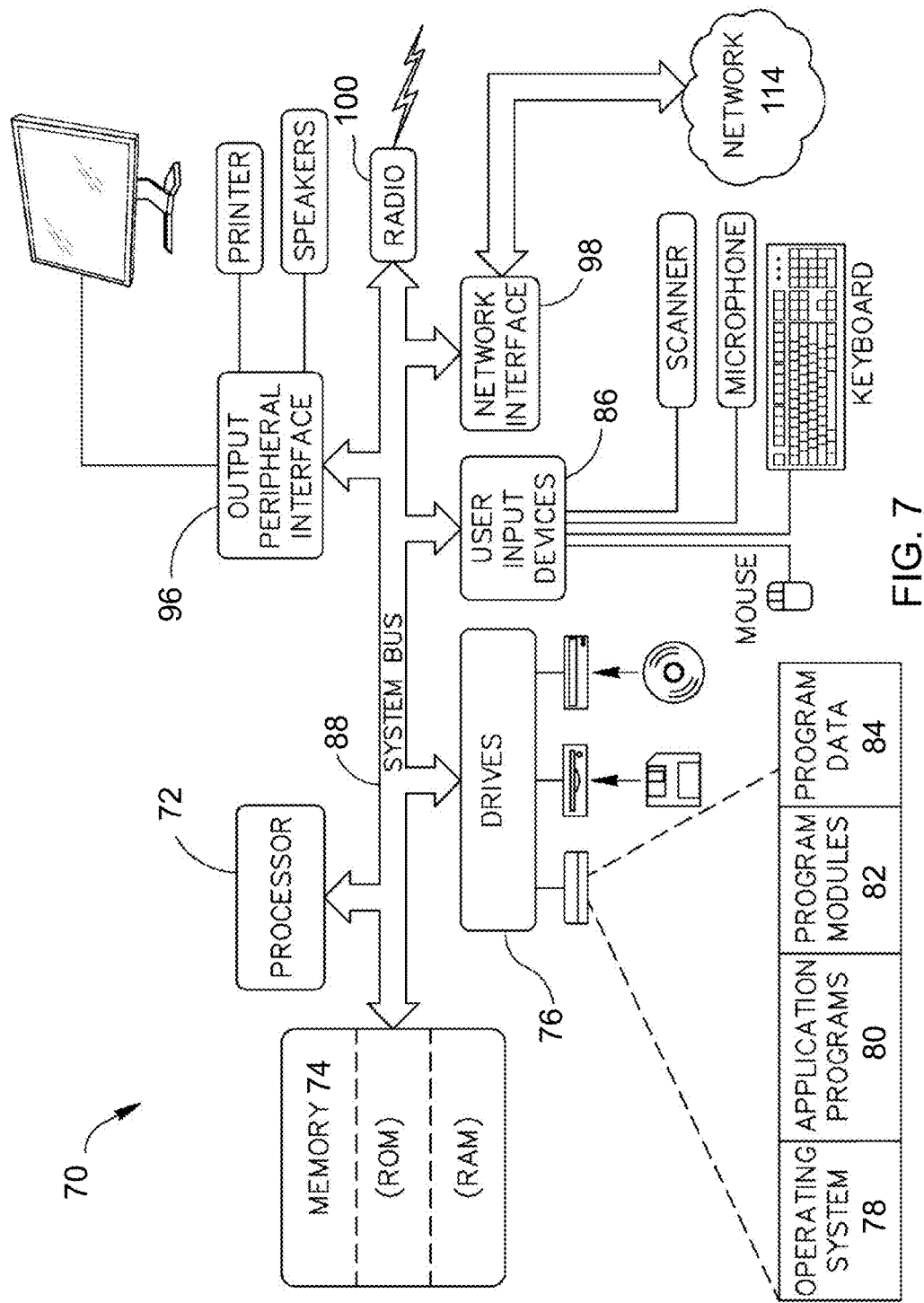
FIG. 7 is a schematic illustrating example components of a server, according to an embodiment of the present invention.
Figure 8:
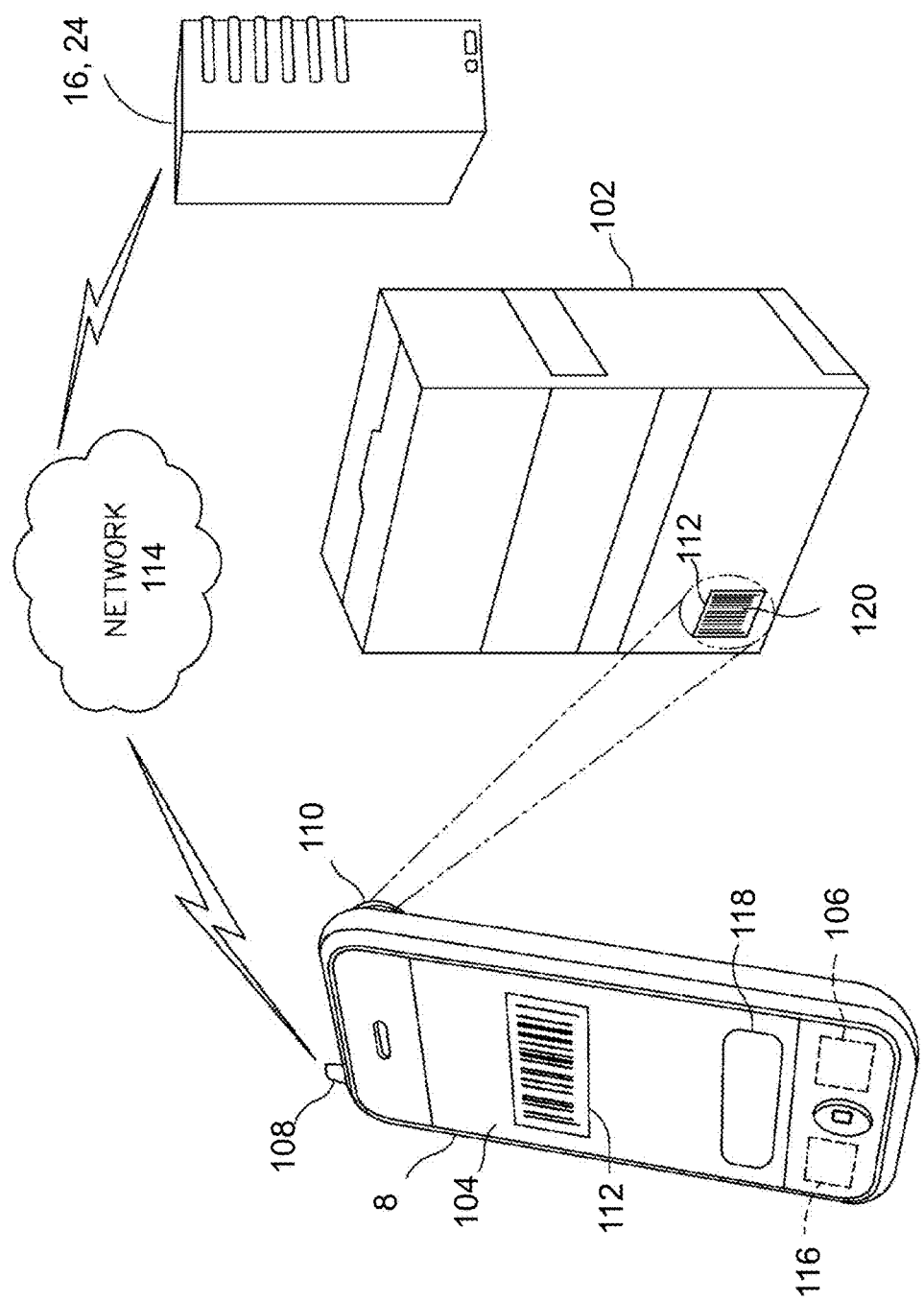
FIG. 8 depicts a block schematic diagram of an exemplary computing system, in accordance with one embodiment of the present invention.

With reference to FIGS. 6-8, an exemplary system 2 for implementing embodiments. FIG. 7 includes a computer 70, which could be any one of a mobile device 8, customer device 26 or remote server 16, 24. Computer 70 may be a portable device, wherein at least some or all of its components are formed together in a single device which can be carried around by a person. The computer 70 includes a processor 72, memory 74 and one or more drives 76 such as a solid stake drive or SSD. The drives 76 and their associated computer readable memory medium provide storage of computer readable instructions, data structures, program modules and other data for the computer 70. Drives 76 can include an operating system 78, application programs 80, program modules 82, and program data 84. Computer 70 further includes input devices 86 through which data may enter the computer 70, either automatically or by a user who enters commands and data. Input devices 86 can include an electronic digitizer, a flatbed scanner, a barcode reader, a microphone, a camera, a video camera, a keyboard and a pointing device, commonly referred to as a mouse, a trackball or a touch pad, a pinpad, any USB device, any Bluetooth enabled device, an RFID or NFC device, and a debit card reader. Other input devices may include a joystick, game pad, satellite dish, scanner, touchscreen and the like. In one or more embodiments, input devices 86 are portable devices that can direct display or instantiation of applications running on processor 72.

These and other input devices 86 can be connected to processor 72 through a user input interface that is coupled to a system bus 88, but may be connected by other interface and bus structures, such as a parallel port, game port or a universal serial bus (USB). Computers such as computer 70 may also include other peripheral output devices such as speakers, printers, and/or display devices, which may be connected through an output peripheral interface and the like.

Computer 70 also includes one or more radios 100 or other type of communications device for wirelessly transmitting and receiving data for the computer 70 with the aid of an antenna. Radio 100 may wirelessly transmit and receive data using WiMAX™, 842.11a/b/g/n, Bluetooth (e.g., BLE), 2.5G, 3G, and 4G, wireless standards.

Computer 70 may operate in a networked environment using logical connections to one or more remote computers, such as a remote server 24. The remote server 24 may be a personal computer, a server, a router, a network PC, a peer device or other common network node, and may include many if not all of the elements described above relative to computer 70. Networking environments are commonplace in offices, enterprise-wide computer networks, intranets and the Internet. For example, in the subject matter of the present application, computer 70 may comprise the source machine from which data is being migrated, and the remote computer may comprise the destination machine. Note, however, that source and destination machines need not be connected by a network or any other means, but instead, data may be migrated via any media capable of being written by the source platform and read by the destination platform or platforms. When used in a LAN or WLAN networking environment, computer 70 is connected to the LAN through a network interface 98 or an adapter. When used in a WAN networking environment, computer 70 typically includes a modem or other means for establishing communications over the WAN, such as radio 100, to environments such as the Internet. It will be appreciated that other means of establishing a communications link between computer 70 and other computers may be used.

With reference to FIG. 8, illustrated is an exemplary representation of a mobile device 8 for purchasing an item 102 from a retailer at a retail establishment. Mobile device 8 includes any portable electronic device having a processor 106 for executing applications and a display 104 for displaying information connected with the processor 106, and includes such devices as a personal desktop assistant (PDA), a portable computer, a mobile telephone, a smartphone, a netbook, and a tablet computer. Display 104 can use any of a variety of types of display technologies, such as a liquid crystal display (LCD), a cathode-ray tube type display, an electronic ink display, a light emitting diode (LED) type display such as an OLED display, and a plasma display. Preferably, the mobile device 8 also includes a communications device 108 and a scanning module 110. The communications device 108 is connected with the processor 106 and capable of sending and receiving information between one or more other computers connected with the mobile device 8. Preferably, communications device 108 is capable of wirelessly transmitting signals to another computer, such as remote server 16, 24, using a radio transmitter and a radio receiver connected with an antenna. The scanning module 110 is capable of receiving identification information 112 from an item 102 and converting the identification information 112 into a format that the processor 106 can read, such as digital data. Preferably, Scanning module 110 includes any device which can capture, receive and process optical information, such as a barcode or any image, and includes devices such as a digital scanner, a digital camera, a video camera, a barcode reader, and any other type of digital or analog imaging device.

Preferably, communications device 108 communicates with another computer 70, such as remote server 16, 24, via a network 114 using a network interface 116. Network interface 116 is connected with processor 106 and communications device 108, and preferably disposed within remote device 8.

Network 114 may include any type of network that is capable of sending and receiving communication signals, including signals for multimedia content, images, data and streaming video. Network 114 may include a data network, such as the Internet, an intranet, a local area network (LAN), a wide area network (WAN), a cable network, and other like systems that are capable of transmitting information, such as digital data, and the like. Network 114 may also include a telecommunications network, such as a local telephone network, long distance telephone network, cellular telephone network, satellite communications network, cable television network and other like communications systems that interact with computer systems to enable transmission of information between mobile device 8 and another computer such as remote server 16, 24. Network 114 may include more than one network and may include a plurality of different types of networks. Thus, network 114 may include a plurality of data networks, a plurality of telecommunications networks, cable systems, satellite systems and/or a combination of data and telecommunications networks and other like communication systems.

Network 114 is connected with both mobile device 8 and remote server 16, 24 and allows for information to be transmitted and shared between mobile device 8 and remote server 16, 24. Remote server 16, 24 includes any type of computer which can receive, store, process, and transmit information to another computer and includes devices such as a server based computer system capable of interacting with one or more other computer systems.

In one embodiment, mobile device 8 includes location information processing means which allows the mobile device 8 to determine its location. Location information processing means includes devices such a Global Positioning System (GPS) based device, and methods such as using radio triangulation to determine the location of the mobile device 8. Preferably, mobile device 8 includes input means 118 for entering information from a user into the mobile device 8. Input means includes any device which can assist a user to enter information, such as a keyboard, a mouse, a touchpad, a touchscreen, a joystick, a button, and a dial.

Item 102 includes any item or service which is being sold by a retailer. Preferably, the item 102 is located with a retail establishment or store. Item 102 includes item identification information 112 which is any information on the item 102 which assists in identifying the item 102, such as a barcode 120, a serial number, a name of the item 102, and any text, characters, illustrations, or images on the item 102 which can be used to identify the item 102.

In operation, the mobile device 8 is brought into a retail establishment by a customer, or user, and a method for self-checkout with the mobile device 8 is initiated by launching a mobile self-checkout application within the mobile device 8. The mobile self-checkout application 400 on the mobile device 8 and communicates with a terminal sales application which resides on the sale computer system 12. Upon launching the mobile self-checkout application, the user may be first prompted to identify himself/herself by entering user identification information into the mobile device 8 via the input means 118. User identification information may include a username, a password, both a username and password. If user is launching the mobile self-checkout application for the first time, the user may be prompted to enter additional user information in addition to user information. Additional user information includes any information which may be used to identify a user, such as user's name, a user's address, a user's telephone number, a user's credit card information or other user financial information, a user's social security number, a user's driver's license number, a user's birthdate, a user's passport number, and other identifying information which may or may not be stored by mobile device 8 or remote server 14, 24. A self-check out system as described above is more fully described in US Patent Application Publication 2012/0095853, published on Apr. 19, 2012, which is hereby incorporated by reference.

Automatic Payment Authorization

First Embodiment

In one aspect of the present invention, the system 2 allows the customer to tender payment utilizing the mobile device 8. As described below, in one embodiment, the system 2 allows the customer mobile device 8 and the system 2 to (at least temporarily) be paired and allow the customer to authorize payment for a customer order without requiring that the customer handle, manipulate, or otherwise interact with, the mobile device 8 to complete the transaction. In this embodiment, the system 2 utilizes an authorization code entry device 15 which is coupled to and/or communicates with the sale computer system 12. For example, the authorization code entry device 15 may be a keypad coupled to the sale computer 15 for the customer to enter an authorization code, e.g., a personal identification number or PIN to complete the transaction.

In general, upon entering the store, pick-up location, or in the case of a delivery transaction, entering the vicinity of the vehicle, the customer's mobile device pairs up, i.e., identifies itself, with the system 2 via the wireless communication unit. The system 2, based on the identification of the mobile device accesses the associated customer account in the database to obtain the customer's method or methods of payment. Once the goods or items have been scanned or itemized and the customer is ready to check out, the customer need only enter their authorization code, e.g., PIN, onto the authorization code entry device 15 and payment is authorized.

The wireless communication unit 4 communicates with any suitable wireless communications protocol, such as Near Field Communications (NFC), blue-tooth, and/or wireless Local Area Network (Wi-Fi). The customer control unit 6 may be implemented, in part, by a software application or "app" running on the processor 106 of the mobile device 8. The software application may be a specific application associated with the retail environment 10 or store(s) 20. There may be one or more wireless communication units 4 associated with the retail environment 10, e.g., at least one wireless communication units located at each entrance to the retail environment 10 or store 20 or near the checkout area or station.

If the retail environment 10 is a delivery vehicle, then there may be one or more situated or located around the delivery vehicle. As the customer approaches the delivery vehicle, the mobile device 8 and the system 2 pair.

The wireless communications unit 2 may continuously or periodically emit or transmit a beacon signal using the wireless communications protocol. The beacon signal may include a retail environment code associated with the retail environment 10.

The database 18 is configured to store a plurality retail environment codes and the retail environment 10 associated with each of the retail environment codes. The database 18 may also store a plurality of customer account associated with a plurality of customers. Each customer account includes one or more methods of payment, a stored authorization code, as well as a customer control unit identification code. The customer control unit identification code may be the cell phone number of the mobile device 8.

The customer control unit 6 receives the beacon signal, once identified as a beacon signal, transmits the customer control unit identification code, e.g., associated with the mobile device, e.g., a cell phone number. The wireless communications unit 4 receives the customer control unit identification code and sends the customer control unit identification code and the beacon signal, i.e., the retail environment code associated with the retail environment 10 to the sale computer system 12.

In response to receiving the beacon signal and the customer control unit identification code, the sale computer system 12 retrieves, from the database 18, the retail environment 10 associated with the retail environment code included in the beacon signal and to temporarily associate the customer control unit identification code with the retail environment 10. The customer control unit identification code may be associated with the retail environment 10 until: (a) a predetermined time, e.g., two hours, has passed, or (b) a transaction has been completed, or (c) the mobile device 8 is paired up with another wireless communication unit located at an exit to the retail environment 10.

The above described pairing method may be used for any type of transaction. For example, it may be applied to customer orders received online and assembled for delivery or pickup by the customer. It may also be used for situations where the customer visits a store and assembles the customer order and either self-checkouts or uses a traditional checkout procedure.

Once the customer order has been assembled and scanned into the sale computer system 12 or sale computer 14 and the system 2 is ready to receive tender of payment, the customer is prompted to enter the authorization code on the authorization code entry device 15. If the entered authorization code matches the matches the authorization code stored in the customer account associated with the customer control unit identification code, then payment is authorized using the one or more methods of payment stored in the account.

In some embodiments, each customer account may include more than one method of payment. In one embodiment, the customer may be given a choice of payment methods to utilize for this transaction/customer order at the authorization code entry device 15. After the customer selects a method of payment, then the customer may be prompted to enter the authorization code for the selected method of payment. Each method of payment may have a separate authorization code. Alternatively, each method of payment may be linked to specific retail environments or classes/categories of retail environments. The method of payment may be chosen based on the retail environment code.

If a method of payment has not been set for a specific retail environment, then the selected method of payment may be set as the default method of payment for future customer orders. The customer may be prompted to confirm the method of payment as the default method or may be able to change it later.

If the entered authorization code matches the authorization code or more than one customer control unit 6 that is (temporarily) associated with the retail environment 2 than the customer will be prompted to enter a second authorization code, e.g., the cell phone number for confirmation.

Figure 9:
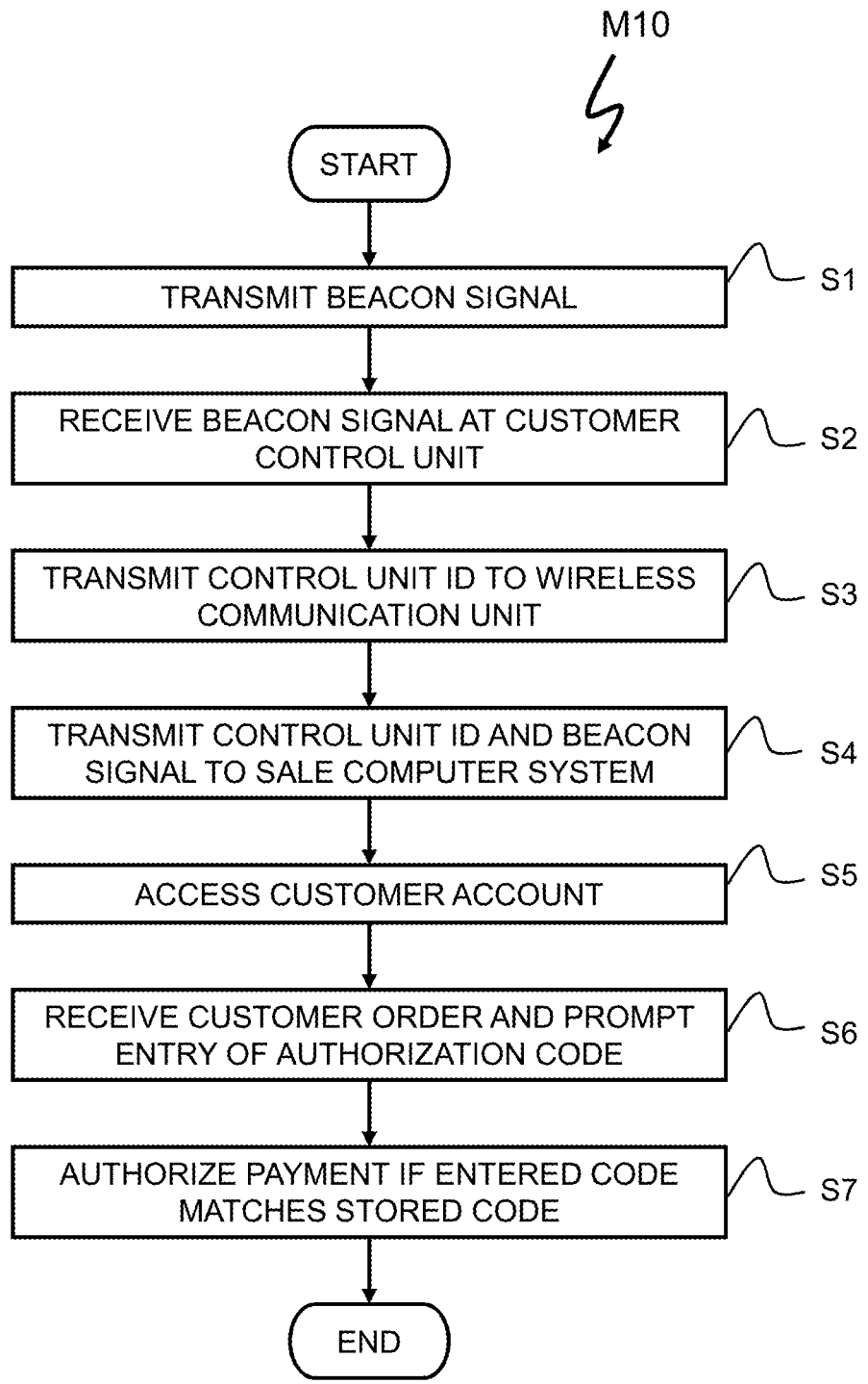
FIG. 9 is a first flow diagram of a method for authorizing payment for a customer order, according to an embodiment of the present invention.

With reference to FIG. 9, a flow diagram of a method M10 for approving a payment for a customer order according to an embodiment of the present invention will now be explained. In a first step S1, the wireless communications unit 2 continuously or periodically emits or transmits a beacon signal using the wireless communications protocol, e.g., Bluetooth. The beacon signal may include a retail environment code associated with the retail environment 10.

In a second step S2, the customer control unit 6 receives the beacon signal. Once the beacon signal is identified, the customer control unit transmits the customer control unit identification code to the wireless communication unit 6 in step S3.

In a fourth step S4, the wireless communications unit 4 receives the customer control unit identification code and sends the customer control unit identification code and the beacon signal, i.e., the retail environment code associated with the retail environment 10, to the sale computer system 12.

In a fifth step S5, the sale computer system S5 access the customer account. The sale computer system 12 retrieves, from the database 18, the retail environment 10 associated with the retail environment code included in the beacon signal and to temporarily associate the customer control unit identification code with the retail environment 10. The customer control unit identification code may be associated with the retail environment 10 until: (a) a predetermined time, e.g., two hours, has passed, or (b) a transaction has been completed, or (c) the mobile device 8 is paired up with another wireless communication unit located at an exit to the retail environment 10.

Once the customer order has been assembled and scanned into the sale computer system 12 or sale computer 14 and the system 2 is ready to receive tender of payment, in a sixth step S6, the customer is prompted to enter the authorization code on the authorization code entry device 15. If the entered authorization code matches the authorization code stored in the customer account associated with the customer control unit identification code, then payment is authorized using the method of payments stored in the account in a seventh step S7.

Once payment has been accepted, an electronic receipt may be generated. The electronic receipt may include, but is not limited to, an itemization of the goods and/service purchased, the retail environment identification code, customer information, taxes paid, and information related to the method of payment used. The electronic receipt may be sent to the customer control unit 6 (and stored within the app) and/or sent to the mobile device 8, e.g., in an email message sent to an email address associated (and stored within) the customer account and/or stored in the customer account in the database 18.

Second Embodiment

In a second embodiment, automatic payment authorization may be performed utilizing a localized computer network. At the time of authorization, a direct communications link over a network is not required between the customer control unit 6 or mobile device 8 and the remote server 16 is not required. In this embodiment, a localized wireless communications unit 17 is used at the time of payment verification or authorization. The localized wireless communications unit 17 may use NFC or Bluetooth to receive information from the customer control unit 6. Alternatively the localized wireless communication 17 may include a barcode reader that is configured to and capable of reading a barcode (see below) that is generated by the customer control unit 6.

In general, at a point in time where there is an external communication link between the customer control unit 6 and the server 16, the customer control unit 6 and the server 16 are paired and synced. For example, at this time, an encryption key is generated or established and shared and a predetermined piece of data is encrypted utilizing the shared encryption key. After the customer order has been received at the sale computer 14, the predetermined piece of data is encrypted by the customer control unit 6 and communicated by the customer control unit 6 over the localized communication network. The encrypted data is sent to the server 16 and if there is a match, then the payment is authorized using the stored payment method(s).

As mentioned above, the localized wireless communication unit 17 is located relative to 10 retail environment and is operable to communicate via a localized communications network. In particular, a sale computer or terminal may be located at one or more checkout stations located throughout a store. Each checkout station may have a localized communications unit 17. The localized communications unit 17 may include a NFC reader/transmitter, a Bluetooth radio, or barcode reader, or other suitable device.

The customer control unit 6 is associated with the customer and is configurable to communicate with the localized communications network and an external communications network. The external communications network could be a cell data network, wireless local area network, or any suitable network. As described below, the customer control unit 6 and the server 16, 24 may communicate across the external communications network when available in order to pair up and synchronize, as described in more depth below.

The customer control unit 6 has a customer identification number and includes a customer control unit internal clock. The database 18 is configured to store a customer account associated with a customer. The customer account includes the customer identification number and a method of payment.

The sale computer system 12 is configurable to communicate with the external communications network and has a sale computer system internal clock.

When the customer control unit 6 and the sale computer system 12 are in communication over the external communications network, the customer control unit 6 may send a synchronization request to the sale computer system 12 across the external communications network. This may be done automatically on a periodic basis or may be initiated by the customer via the customer control unit 6.

Either the sale computer system 12 or the customer control unit 6 may be used to establish a shared encryption key. The shared encryption key may be generated randomly or automatically. Alternatively, the customer control unit 6 may prompt the customer to enter a code, phrase or random combination of letters, numbers and/or other symbols to be used as the shared encryption key.

The sale computer system 12 stores the shared encryption key in the database and synchronizes the customer control unit internal clock and the sale computer system internal clock when the sale computer system and the customer control unit are in communication over the external communications network. The clocks may be synchronized by modifying one or both of the internal clocks or by determining a difference between the two internal clocks and storing the difference between the two clocks in the database 18.

When the customer is ready to check out, the sale computer system 12 receives the customer order. The customer order may be established and sent to the sale computer system 12 by any suitable manner, including, but not limited to: a checkout process at a checkout station, an online order, and/or an online delivery, or other suitable manner. Once the customer order has been received, the customer control unit 6 encrypts, using the shared encryption key, a current customer control unit time from the customer control unit and sends the encrypted current customer control unit time and the customer identification number to the sale computer system 12 over the localized communications network. If the localized wireless communications unit 17 includes a barcode reader, then the customer control unit may embed the encrypted current customer control unit time and the customer identification number in a barcode which is displayed by the mobile device 8 and read by the barcode reader.

The localized wireless communications unit 17 sends the encrypted current customer control unit time and the customer identification number to the sale computer system 12 and decrypt the encrypted current customer identification unit time using the shared key. The sale computer system 12 compares the decrypted current customer unit time and a current sale computer system time (taking into account the stored difference between the two time stored in the database previously, if needed) and authorizes payment for the customer order utilizing the stored method for payment if a difference between decrypted customer control unit time and the current sale computer system time is less than a predetermined difference.

Figure 10:
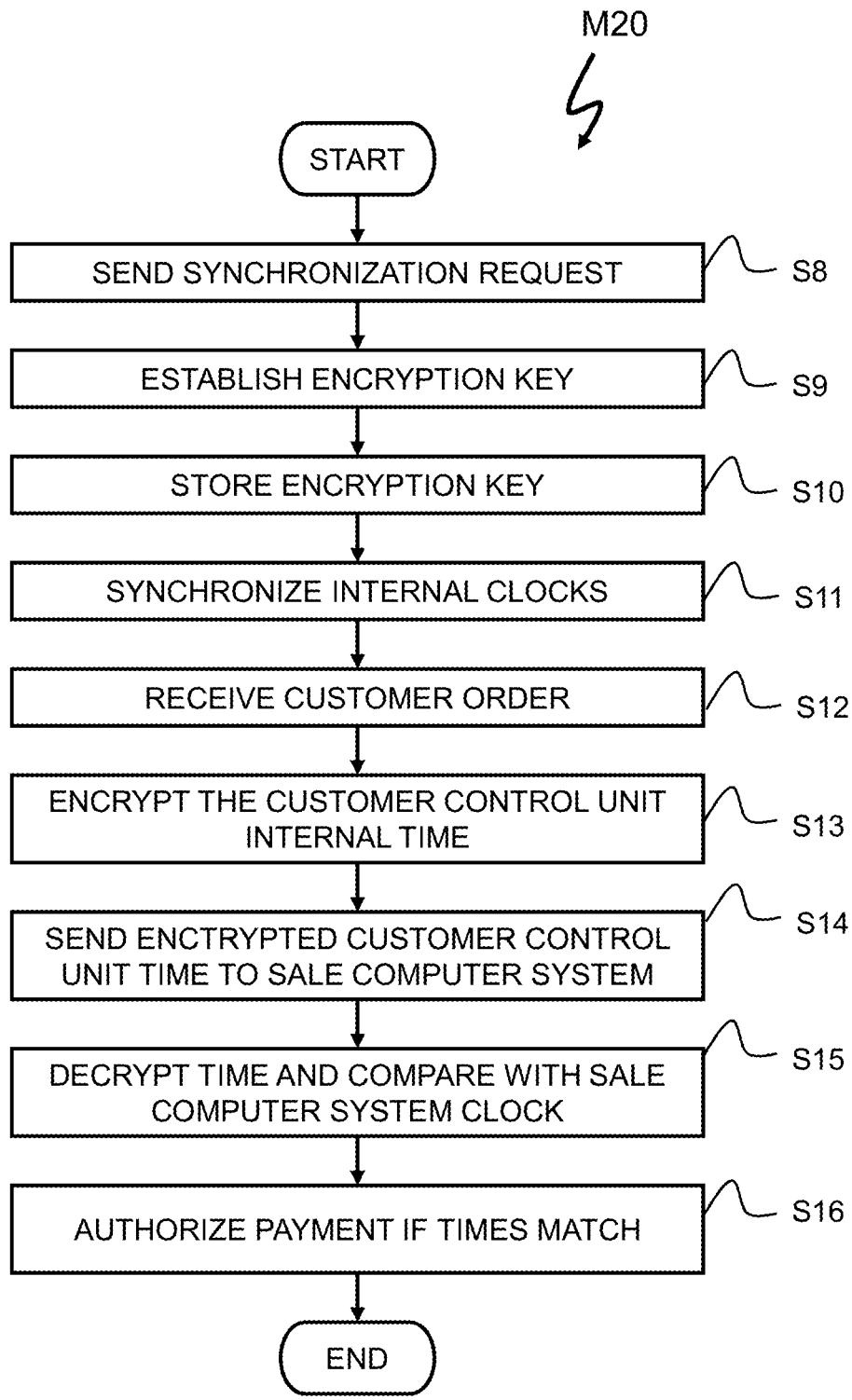
FIG. 10 is a third flow diagram of a method for authorizing payment for a customer order, according to an embodiment of the present invention.

With reference to FIG. 10, a flow diagram of a method M20 for approving a payment for a customer order according to the second embodiment of the present invention will now be explained. In a first step S8, when the customer control unit 6 and the sale computer system 16 are in communication over the external communications network, e.g., a wireless LAN or a cellular data network, the customer control unit 6 sends a synchronization request to the sale computer system. The synchronization request may be sent automatically on a periodic basis or may be initiated by the customer via the customer control unit 6. In a second step, a shared encryption key is established. The shared encryption key may be generated randomly or automatically. Alternatively, the customer control unit 6 may prompt the customer to enter a code, phrase or random combination of letters, numbers and/or other symbols to be used as the shared encryption key.

In a third step S10, the sale computer system 12 stores the shared encryption key in the database and, in a fourth step S11, synchronizes the customer control unit internal clock and the sale computer system internal clock. The clocks may be synchronized by modifying one or both of the internal clocks or by determining a difference between the two internal clocks and storing the difference between the two clocks in the database 18.

When the customer is ready to check out, the sale computer system 12 receives the customer order (fifth step S12). The customer order may be established and sent to the sale computer system 12 by any suitable manner, including, but not limited to: a checkout process at a checkout station, an online order, and/or an online delivery, or other suitable manner.

In a sixth step S13, the customer control unit 6 encrypts, using the shared encryption key, a current customer control unit time from the customer control unit 6 and, in a seventh step S14, sends the encrypted current customer control unit time and the customer identification number to the sale computer system 12 over the localized communications network.

In an eighth step S15, the sale computer system 12 decrypts the encrypted current customer control unit time using the shared encryption key and compares the decrypted time with the current sale computer system time. In a ninth step S16, if the times match (are equal within a predetermined threshold), then the payment for the customer order is authorized.

Tendering Payment Using Multiple Payment Methods

In another aspect of the present invention, the system 2 may automatically utilize more than one stored method payment on the same transaction. It should be noted that the system and methods described below for utilizing multiple payment methods on a single transaction are not limited to the any specific method for authorizing transactions or payments for a transaction. The automatic use of multiple payment methods described below may be used with other approval methods.

The database may be configured to store a plurality of goods and a customer account associated with a customer. The plurality of goods may be grouped by a classification and/or may be listed individually. The customer account includes a customer identification number and a plurality of payment methods, e.g., a first method of payment and a second method of payment. In additional, within the customer account, one of the payment methods, e.g., the first method of payment may be associated with at least one good (or class of goods) and another one of the payments methods, e.g., the second method of payment is associated with at least one other good (or class of goods).

Examples of goods that may be included in the database include: computer printer paper and bananas. Additionally (or alternatively), the computer printer paper may be classified as office supplies and the bananas may be classified as groceries.

With the customer account, computer printer paper (or office supplies as a category) may be associated with the first payment method and bananas (or groceries) may be associated with the second payment method.

The sale computer system 12 may access the database 18 and receives a customer order associated with the customer. The customer order may a list of goods to be purchased and the customer identification number. The sale computer system 12 after receiving the customer order accesses the customer account in the database 18 as a function of the customer identification number and processes the customer order by (1) analyzing each one of the goods on the customer order, (2) authorizing payment for the at least one good using the first method of payment if the at least one good is on the customer order, and (3) authorizing payment for the at least one other good using the second method of payment if the at least one other good is on the customer order. In other words, for each good or class of goods. In one embodiment, included in the customer order is a product code for each good or service, such as the stock keeping unit or SKU or the Universal Product Code (UPC). Within the database, goods or services may be classified based on this product code. As stated above, different payment methods may be based on individual goods or services (based on the product codes). Or classifications, e.g., office products and groceries, may be used and assigned a method of payment.

Figure 12:
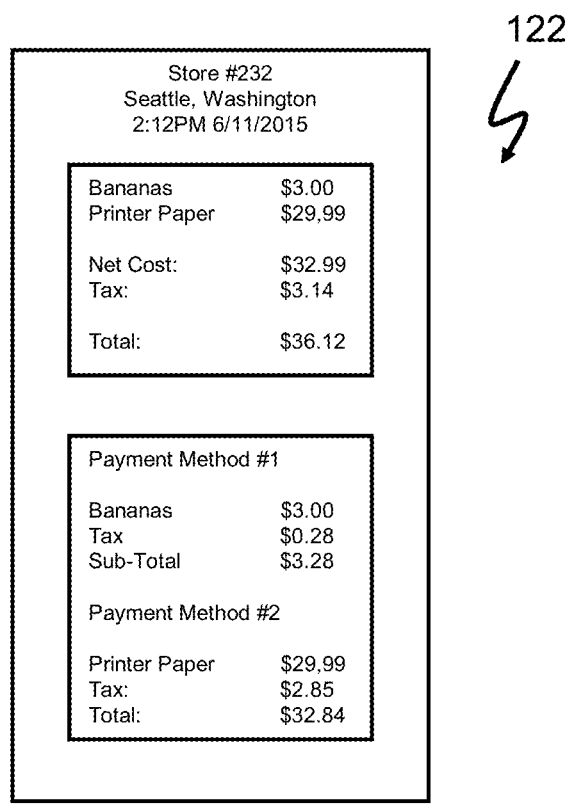
FIG. 12 is a diagrammatic illustration of a paper or electronic receipt illustrating a sample retail transaction and multiple methods of payment, according to an embodiment of the present invention.

The sale computer system 12 may also generate an electronic and/or paper receipt 122 (see FIG. 12). The receipt may include a listing or groups of the goods or services which were paid for by each payment method.

Figure 11:
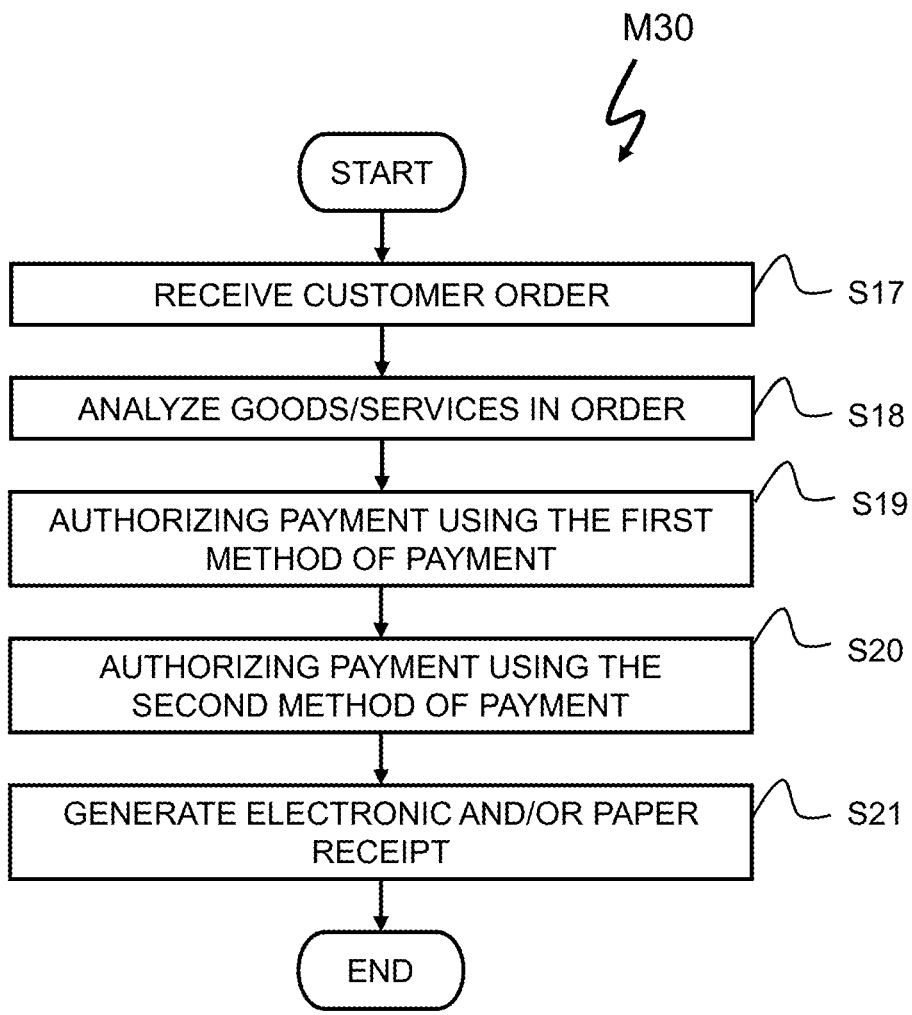
FIG. 11 is a third flow diagram of a method related to a retail transaction, according to an embodiment of the present invention.

With reference to FIG. 11, a flow diagram of a method M30 for approving a payment for a customer order according to the second embodiment of the present invention will now be explained. In a first step S17, a customer order is received by the sale computer system 12. The customer order may include a plurality of goods and include a product identified, e.g., a SKU number. In a second step S18 each of the goods in the customer order is analyzed and compared against the data in the database. The goods may be classified. Based on the customer account, some of the goods (or a class of goods) may be associated with a first payment method and other goods (or a second class of goods) may be associated with a second payment. In a third step S19, payment for the good(s) or class of goods associated with the first payment method is authorized. In a fourth step S20, payment for the good(s) or class of goods associated with the second payment method is authorized.

Communications Between the Customer Control Unit and the Sale Computer

For most types of mobile payments, the user or customer's mobile device must be paired up with the customer account (which is generally accessed through the sale computer system). It is common to pair up the mobile device at the sale computer, e.g., a point-of-sale computer or terminal. Common technologies to provide communication between the mobile device and the sale computer include NFC or QR code scanning. However, both of these technologies require additional or specialized readers located at each sale computer. The system and methods described below provide for communication between the customer control unit 6 and the sale computer 14. For example, the sale computer 14 may be a POS computer or terminal located at a checkout station in a retail store.

With reference to FIG. 1, the system 2 may include an emitter 19. The emitter 19 is in communication with the sale computer system 12 and is associated with the retail environment 10. The emitter 19 is generally configured to a vibratory signal (see below). In general, the vibratory signal has data embedded therein. The customer control unit 6 is associated with a customer and includes a sensor 7. The sensor 7 is configured to receive the vibratory signal and send the vibratory signal to the customer control unit 6. The customer control unit 6 is configured to decode the vibratory signal and recover the data.

In one embodiment, the emitter 19 is a speaker of the sale computer 14. The vibratory signal is an audio signal which, in one audio signal that is inaudible to humans, i.e., generally above 20 kHz. In one embodiment, the audio signal has one or more predefined frequency components. The customer control unit 6 is configured to receive the vibratory signal and to identify the predefined frequency components of the signal. Once identified the frequency components may be decoded and, using a look-up table, provide additional information. For example once decoded, the control unit may send (over the external communications network) the decoded signal to the remote server 16. The database 18 may include a lookup table that includes a listing of retail environments, e.g., stores. The customer control unit 6 may be configured to identify the retail environment as a function of the frequency component(s) of the audio signal. Any information stored in the database 16 may be sent back to the customer control unit 6 over the external communications network. The sensor 7 may be the microphone of the mobile device 8.

In another embodiment, the emitter 19 includes a platform on which the customer places their mobile device 8. The emitter 19 under control of the sale computer 14 vibrates to create the vibratory signal. In this embodiment, the vibratory signal is sensed by an accelerometer of the mobile device 8.

In other embodiments, the sale computer system 12 is used in a retail transaction. Data regarding the transaction may be sent to the customer control unit 6 through the vibratory signal. For example, the vibratory signal could have embedded therein a digital signal that transmits information that may include, but is not limited to, the customer order or basket, register or sale computer number, transaction total, an electronic receipt, etc. . . . The customer control unit 6 may communicate back to the sale computer system 12 via the external communications network, e.g., a wireless LAN or a cellular data network. Using these communications protocols or methods, the customer control unit and the sale computer system 12 may be paired and transactions performed.

Figure 13:
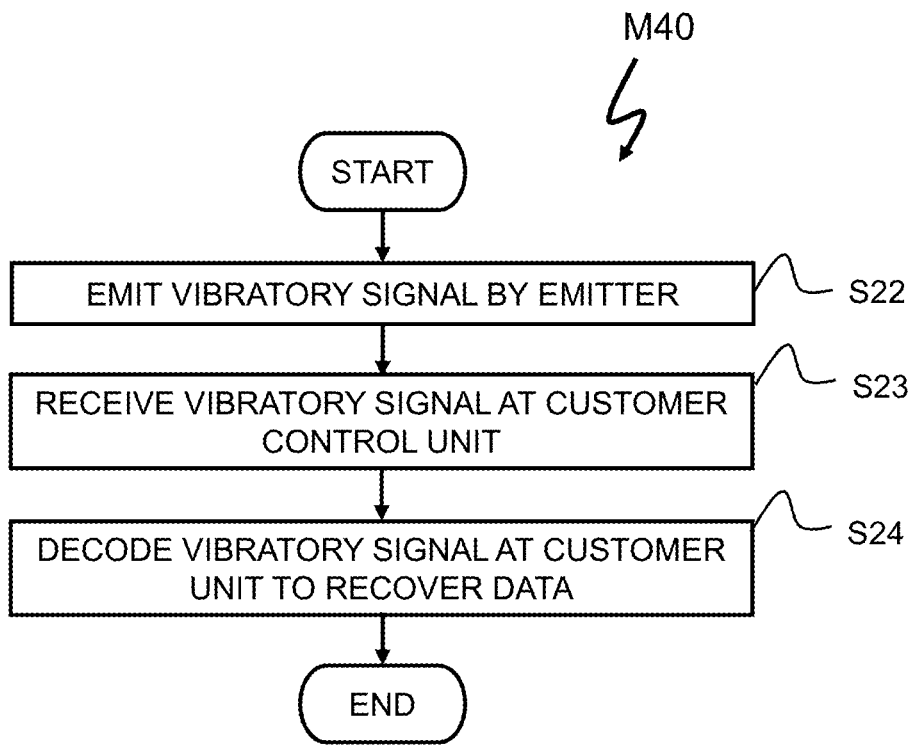
FIG. 13 is a fourth flow diagram of a method for providing communication between a customer control unit and a sale computer system, according to an embodiment of the present invention.

With reference to FIG. 13, a flow diagram of a method M40 for providing communication between a customer control unit and a sale computer system 12 will now be explained. In a first step S22, the emitter 19 emits a vibratory signal. In a second step S23, the vibratory signal is received at the customer control unit 6. The vibratory signal is decoded by the customer control unit 6 and the data embedded therein is recovered.

Real-Time Price Comparison

Figure 14:
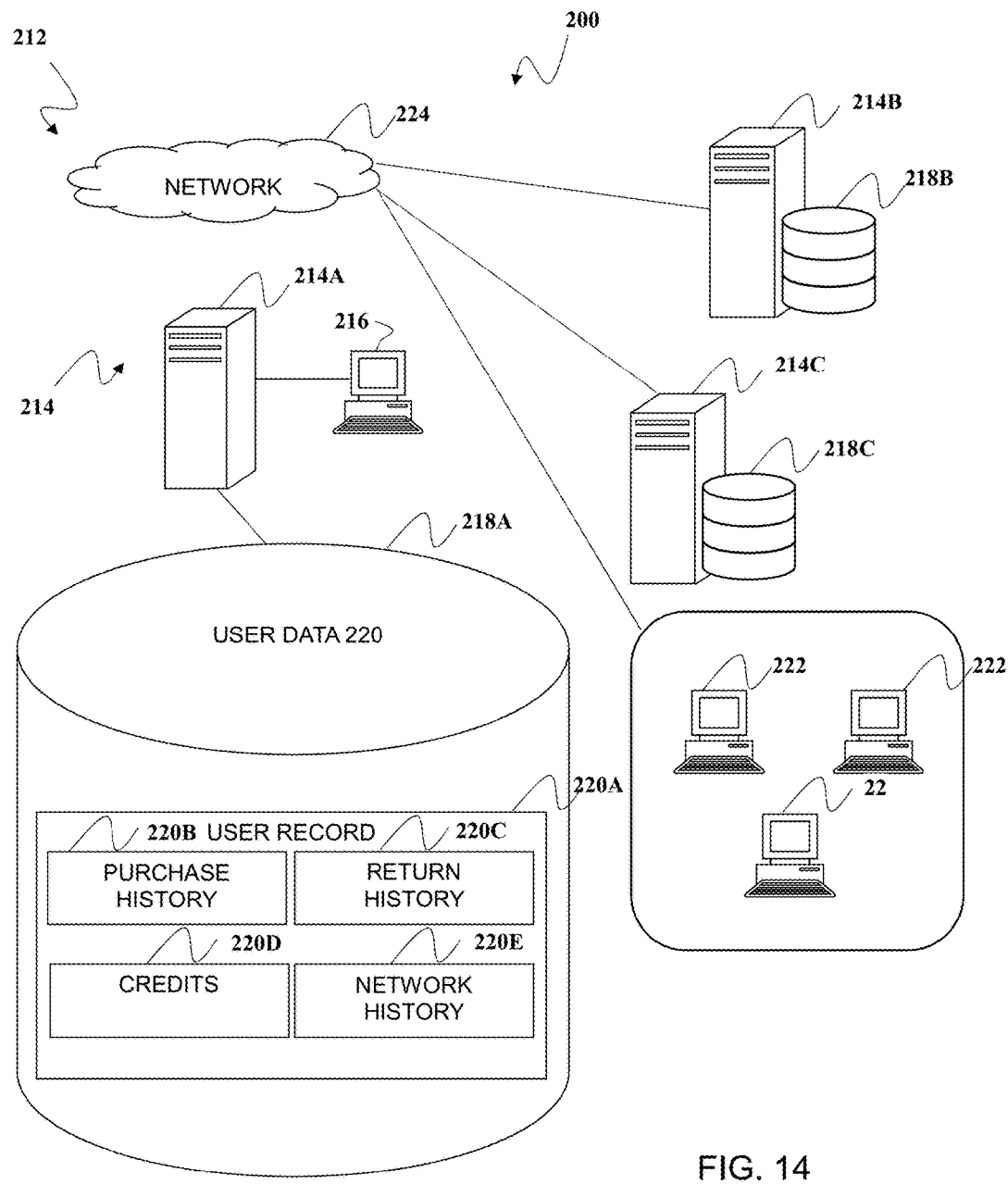
FIG. 14 is a diagrammatical illustration of a price comparison system, for use with the present invention; and, FIG. 15 is a fifth flow diagram of a method for providing real-time price matching, according to an embodiment of the present invention.

In another aspect of the present invention, the system 2 submits the prices for the goods or items in a customer's current transaction, prior to check-out to a price comparison system 200 (see FIG. 14). Any credit or credits established by the price comparison system 200 may be applied to the current transaction. In general, the price comparison system 200 compares the prices of the items or goods within the customer's basket with the prices being charged by competitors and establishes a credit based on the difference. For example, if the price being charged by the retailer is higher than a competitor's price, the customer may be awarded a credit. The credit may be awarded to the customer's account to be applied, or used during a later transaction. However, as discussed below, the credit may be applied to customer's current transaction. Thus, the credit would be applied to the same transaction during which the credits are awarded.

In another aspect of the present invention, the price comparison system 200 is utilized within a customer loyalty-type program (or part of such a program) to which the customer must be enrolled. Thus, the credits would not be awarded and cannot be used by the customer unless the customer is part of, or enrolled in, the program.

Referring to FIG. 14, the price comparison system 200 and methods may operate in a network environment 212 and may be used to implement methods as described herein. The network environment 212 may include a server system 214, associated with a corporate parent or controlling entity, i.e., the retailer, having one or more retail establishments associated therewith. The retail establishments may include one or more sale terminals or point of sale devices (POS) 216 on which transactions may be concluded. Records of transactions may be transmitted to the server system 214 by the sale terminal 216 at the various retail establishments.

In some embodiments, data regarding third parties and used according to the methods disclosed herein, may be gathered from various sources. For example, a server 214B of one entity may provide a website providing access to an online product database 216C, which may include access to product records including product prices, corresponding product identifiers and other descriptive information. A database 218B may also include a publicly accessible website or the like listing advertisements for products offered for sale in a retail establishment.

In some embodiments, data regarding third parties may be obtained from a server or server system 214C operated by a data gathering entity. For example, the server system 214C may store third party pricing data 218C. The pricing data 218C may include data gathered from advertisements published by retail entities. Pricing data could include entries including fields such as an entity identifier, location, price, product identifier (e.g. UPC), a date the product was offered at the price or the like. The pricing data may be gathered and be provided within N day of Hours from when it was published. For example, pricing data may be provided the next day, 48 hours, or 72 hours after initially publicized.

The server system 214, or server 214A, may access and use user data 220 which may include a plurality of user records 220A. A user record 220A may be associated with a particular user who may be identified by a unique customer identifier. The user may have access to some or all of the data in the user record, and a user name and password may be associated with the user record and with which a user may log in the server system 214 in order to obtain access to the user record 220A.

The user record 220A may include such data as a purchase history 220B, including a record of previous transactions conducted by the user associated with the user record 220A at the various sale terminals 216 associated with the server system 214. The user record 220A may further include a record of credits 220D assigned to the user/customer associated with the user record, as well as a redemption or usage of such credits. The methods by which the credits 220D are assigned and used are described in greater detail below.

In some embodiments, fraud detection methods as described herein may evaluate the purchase history 220B, credits 220D, and one or more other type of information about a user associated with the user record 220A. For example, a return history 220C of a user that indicates which items were returned by the user and when may be included in the user record 220A. A network history 220E may store aspects of a user's electronic interactions with the server system 214, such as a type of device used by the user when interacting with the server system 214, an identifier of the device, a type of browser used, the internet protocol (IP) address of the device, browser user-agent, and the like, may be stored as part of the network history 220E.

Customers may access the server system 214 in order to participate in the methods described herein by means of user computing devices 222 that may be embodied as desktop or laptop computers, tablet computers, smart phones, or the like. Communication among server system 214, servers 214A, 214B, 214C, sale terminals 216, and user computing devices 222 may occur over a network 224, such as the Internet, local area network (LAN), wide area network (WAN) or any other network topology. Communication may be over any wired or wireless connection. A suitable price comparison system 200 is shown in more detail in commonly owned U.S. patent application Ser. No. 14/985,981, filed on Dec. 31, 2015, which is hereby incorporated by reference.

It should be noted that, although the price comparison system 200 is described as separate, the price comparison system 200 and the system 2 may be a single system 2, 200 or may share or utilize some of the same components.

Returning to FIGS. 1 and 6, a first database 60, 62 is configured to store a plurality of goods and a customer account associated with a customer of a retailer. The customer account includes a customer identification number and a method of payment. The sale computer system 12 is configurable to communicate with the database 60, 62 and to receive a customer order associated with the customer. The customer order includes a list of goods to be purchased. As discussed above, the customer order may be placed online for customer pickup or delivery, or may be assembled by the customer at a retail store.

In one embodiment, the customer may utilize the scanning module 110 of their mobile device 8 to scan the identification information, e.g., in the form of a barcode, of items the customer intends to purchase. The customer control unit 6 on the mobile device 8, sends the identification information to the sale computer system 12 which transmits the identification information and/or price to the price comparison system 200. The sale computer system 12 may transmit the identification information for the scanned goods as the goods are scanned, or during a checkout process.

Alternatively, the identification information, including a price of the associated goods, may be transmitted by the sale computer system 12 during the checkout process. For instance, the sale computer system 12 may include one or more sale computers or terminals 14. The sale terminal 14 may be a self-checkout terminal, or may be operated by a sales employee. The customer or the sales employees scans each item or good to be purchased and the identification information and price of the items or goods are transmitted to the price comparison system 200.

At check-out, the customer order is assembled within the sale computer system 12. The customer order includes the customer identification number, a list of goods to be purchased and a total cost of the customer order. As discussed above, the system 2 establishes an amount of credit as a response of the difference between the price of the goods to be purchased at the retailer and the price of the goods at one or more competitors, for example, if the price at the retailer is greater than the competitor's price. The sale computer system 12 accesses the customer account in the database as a function of the customer identification number and processes the customer order.

In one embodiment of the present invention, in order to be eligible for the credits based on price matching, the customer must be enrolled in a price matching customer loyalty-type program. Thus, the customer must either log in to the price matching customer loyalty-type program through the customer control unit 6, or at the sale terminal 14. Once membership in the loyalty program has been established, the items to be purchased may be submitted to the price comparison system 200.

In one embodiment, for each one of the goods on the customer order, a price for the associated good is sent to the price comparison system 200. In response to the request, the price comparison system 200 queries a second database 218B to find the price or prices the goods are offered by one or more competitors. The sale computer system 12 receives an indication of credit from the price comparison system 200. The credit is responsive to a difference between the price of the associated good at the retailer and pricing information of the associated good with at least one other retailer (see above). The credit may be equal to the difference, may be a predetermined fraction of the difference, or may be a multiple of the difference.

It should be noted that the credit, in general, has not been awarded to the customer until the purchase has been made. At the time of check-out, the credit associated with any price difference of all the goods in the customer order is aggregated.

At the time of check-out, a request to apply the credit towards the total cost or purchase price associated with the customer order is sent to the customer control unit 6 of the customer's mobile device 8. The request is displayed to the customer. The customer may either apply the (aggregate) credit to the total cost or purchase price of the current order. Alternatively, the customer may decide to store the credit in user record 220A for later use. If the customer selects to use the (aggregate) credit for the current transaction, the total cost of the transaction is reduced or modified as a function of the credits.

After the customer selects to either use the credits on the current transaction, or to store the credits, the sale computer system 12 completes the sale/transaction by authorizing payment for the customer order using the method of payment.

In one embodiment, the second database 218B is configured to store pricing information associated with a plurality of products for a plurality of other retailers. The sale computer system 12 is configured to send a search engine request to the price comparison system. The search engine request is a function of the customer order. The price comparison system 200 includes a search engine module coupled to the second database 218D. The search engine search request includes a price associated with at least one of the goods in the customer order, the search engine module receives the search engine search request and is further configured to perform a search of the second database as a function of the search engine search request and return pricing information of the product associated with at least one of the other retailers. A credit determination module is coupled to the first database and the search engine module and is configured to compare the price of the at least one good and the pricing information of the at least one good associated with at least one of the other retailers. The credit determination module is further configured to establish the amount of the credit associated with the at least one good if the comparison of the price of the one good at the retailer and the pricing information of the product associated with at least one of the other retailers meets predefined criteria.

Figure 15:
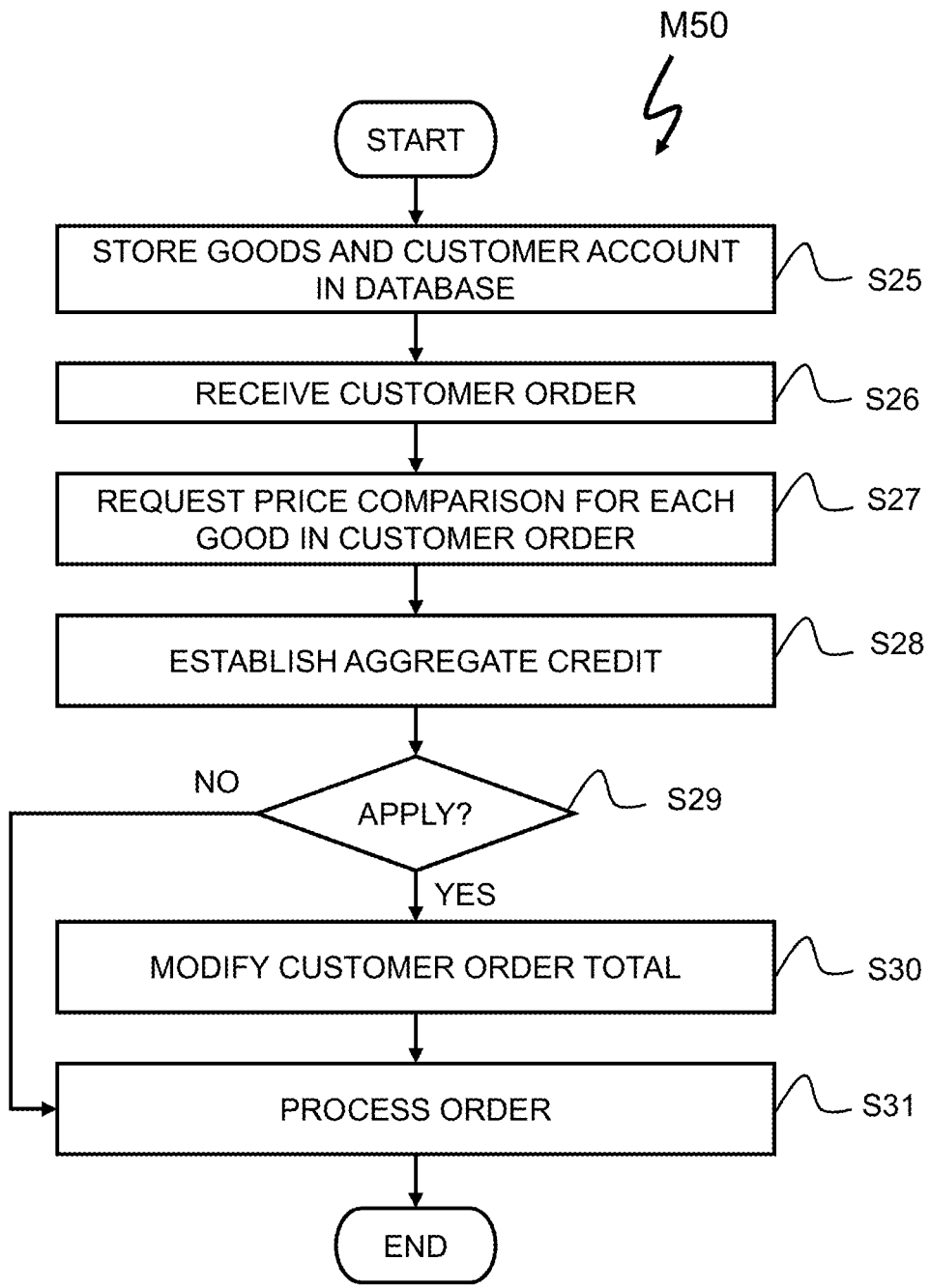

With reference to FIG. 15, a flow diagram of a method M50 for providing real-time price comparison according to an embodiment of the present invention will now be discussed. In a first step S25, a plurality of goods and a customer account associated with a customer of a retailer are stored in a first database. The customer account includes the customer identification number and a method of payment. In a second step S26, a customer order is received at a sale computer system 12. The customer order is associated with the customer and includes a list of goods to be purchased, the customer identification number, and a total cost of the customer order.

In a third step S27, for each one of the goods on the customer order, a price for the associated good is sent to the price comparison system 200. The price comparison system 200 receives the request and responsively sends to the sale computer system 12, an indication of credit based on the difference in price between the retailer and at least one competitor. The sale computer system 12 receives the credit. In a fourth step S28, the credit based on the price difference for each one of the goods in the customer order is aggregated.

In a fifth step S29, the customer is sent an inquiry, e.g., to the customer control unit 6, to determine if the customer desired to apply the aggregated credit to the current customer order, e.g., during the check-out process. If the customer approves the request, the total cost of the customer order may be reduced by the established credit amount (step S30). Lastly, the order may be processed using the method of payment stored in the customer account to pay the total cost or modified total cost.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A system, comprising:
a first database configured to store a plurality of goods and a customer account associated with a customer of a retailer, the customer account including a customer identification number and a method of payment; and
a sale computer system located at a delivery vehicle, the sale computer system configured to:
communicate with the first database;

receive a customer order associated with the customer, the customer order including:
a list of goods to be purchased;
the customer identification number; and
a total cost of the customer order;
access the customer account in the first database as a function of the customer identification number; and
process the customer order by:
emitting a beacon signal from a network interface of the sale computer system, the beacon signal configured to pair the sale computer system with a mobile device associated with the customer;
receiving, through the network interface of the sale computer system and from the mobile device associated with the customer, a pairing request comprising an encryption key and a time associated with an internal clock of the mobile device associated with the customer, the encryption key being randomly generated by the mobile device associated with the customer;
storing, in the first database, the encryption key;
determining a difference between the internal clock of the mobile device associated with the customer and an internal clock of the sale computer system using the time associated with the internal clock of the mobile device associated with the customer and a time associated with the internal clock of the sale computer system;
storing the difference between the internal clock of the mobile device associated with the customer and the internal clock of the sale computer system in the first database;
temporarily modifying the internal clock of the sale computer system such that the internal clock of the sale computer system is synchronized with the internal clock of the mobile device associated with the customer using the difference between the internal clock of the mobile device and the internal clock of the sale computer system;
for each good of the list of goods to be purchased, sending a price for each good of the list of goods to be purchased to a price comparison system;
receiving an indication of a credit from the price comparison system through the network interface of the sale computer system, the credit being responsive to a difference between the price of each good of the list of goods to be purchased at the retailer and pricing information of each good of the list of goods to be purchased with at least one other retailer;
aggregating credits associated with each good of the list of goods to be purchased;
encrypting, using one or more processors of the sale computer system and using the encryption key, the credits, as aggregated;
sending, through the network interface of the sale computer system to a customer control device on the mobile device associated with the customer, a request to apply the credits, as aggregated and encrypted, to the customer order;
in response to the customer approving an application of the credits, as aggregated and encrypted, modifying the total cost of the customer order as a function of the credits, as aggregated and encrypted;
receiving, at the network interface of the sale computer system, a predetermined piece of data encrypted using the encryption key and transmitted from the customer control device on the mobile device associated with the customer;
matching, using the one or more processors of the sale computer system, the predetermined piece of data encrypted using the encryption key with an unencrypted piece of predetermined data;
receiving, via a barcode scanner associated with the sale computer system, data from a barcode displayed on the mobile device associated with the customer and scanned by the barcode scanner, the data from the barcode comprising:
the encryption key;
the time of the internal clock of the mobile device associated with the customer; and
the method of payment;
after completing the matching and when the time of the internal clock of the sale computer system, as modified, matches the time of the internal clock of the mobile device associated with the customer, authorizing payment for the customer order using the method of payment; and
after authorizing the payment, reverting the internal clock of the sale computer system to an original time using the difference between the internal clock of the mobile device and the internal clock of the sale computer system, as stored in the first database.

2. The system of claim 1, further comprising a second database configured to store pricing information associated with a plurality of products for a plurality of other retailers, the sale computer system being configured to send a search engine search request to the price comparison system, the search engine search request being a function of the customer order, the price comparison system including:
a search engine module coupled to the second database and being configured to:
receive the search engine search request comprising a price associated with at least one good of the list of goods to be purchased;
perform a search of the second database as a function of the search engine search request; and
return pricing information of at least one product of the plurality of products associated with at least one retailer of the plurality of other retailers; and
a credit determination module coupled to the first database and the search engine module, the credit determination module configured to:
compare the price associated with the at least one good of the list of goods to be purchased and the pricing information of the at least one product of the plurality of products associated with the at least one retailer of the plurality of other retailers; and
establish an amount of the credits associated with the at least one good of the list of goods to be purchased when a comparison of the price associated with the at least one good of the list of goods to be purchased and the pricing information of the at least one product of the plurality of products associated with the at least one retailer of the plurality of other retailers meets predefined criteria.

3. The system of claim 2, wherein the customer control device is configured to:
allow the customer to scan each good of the list of goods to be purchased; and send an identification of each good of the list of goods to be purchased and an associated price of each good of the list of goods to be purchased at the retailer to the price comparison system.

4. The system of claim 2 further comprising a sale terminal, the sale terminal configured to:
  allow the plurality of goods to be scanned prior to purchase;
  scan each good of the list of goods to be purchased; and
  send an identification of each good of the list of goods to be purchased and an associated price for each good of the list of goods to be purchased to the price comparison system through the network interface of the sale computer system.

5. The system of claim 1, wherein the customer order is received by the sale computer system through the network interface from a website.

6. A method, including the steps of:
  storing, in a first database, a plurality of goods and a customer account associated with a customer of a retailer, the customer account including a customer identification number and a method of payment;
  receiving, at a sale computer system located at a delivery vehicle, a customer order associated with the customer, the customer order comprising:
    a list of goods to be purchased
    the customer identification number; and
    a total cost of the customer order;
  emitting a beacon signal from a network interface of the sale computer system, the beacon signal configured to pair the sale computer system with a mobile device associated with the customer;
  receiving, through the network interface of the sale computer system and from the mobile device associated with the customer, a pairing request comprising an encryption key and a time associated with an internal clock of the mobile device associated with the customer, the encryption key being randomly generated by the mobile device associated with the customer;
  storing, in the first database, the encryption key;
  determining a difference between the internal clock of the mobile device associated with the customer and an internal clock of the sale computer system using the time associated with the internal clock of t he mobile device associated with the customer and a time associated with the internal clock of the sale computer system;
  storing the difference between the internal clock of the mobile device associated with the customer and the internal clock of the sale computer system in the first database;
  temporarily modifying the internal clock of the sale computer system such that the internal clock of the sale computer system is synchronized with the internal clock of the mobile device associated with the customer using the difference between the internal clock of the mobile device and the internal clock of the sale computer system;
  for each good of the list of goods to be purchased, sending a price for each good of the list of goods to be purchased to a price comparison system;
  receiving an indication of a credit from the price comparison system through the network interface of the sale computer system, the credit being responsive to a difference between the price of each good of the list of goods to be purchased at the retailer and pricing information of each good of the list of goods to be purchased with at least one other retailer;
  aggregating credits associated with each good of the list of goods to be purchased;
  encrypting, using one or more processors of the sale computer system and using the encryption key, the credits, as aggregated;
  sending, through the network interface of the sale computer system to a customer control device on the mobile device associated with the customer, a request to apply the credits, as aggregated and encrypted, to the customer order;
  in response to the customer approving an application of the credits, as aggregated and encrypted, modifying the total cost of the customer order as a function of the credits, as aggregated and encrypted;
  receiving, at the network interface of the sale computer system, a predetermined piece of data encrypted using the encryption key and transmitted from the customer control device on the mobile device associated with the customer;
  matching, using the one or more processors of the sale computer system, the predetermined piece of data encrypted using the encryption key with an unencrypted piece of predetermined data;
  receiving, via a barcode scanner associated with the sale computer system, data from a barcode displayed on the mobile device associated with the customer and scanned by the barcode scanner, the data from the barcode comprising:
    the encryption key;
    the time of the internal clock of the mobile device associated with the customer; and
    the method of payment;
  after completing the matching and when the time of the internal clock of the sale computer system, as modified, matches the time of the internal clock of the mobile device associated with the customer, authorizing payment for the customer order using the method of payment; and
  after authorizing the payment, reverting the internal clock of the sale computer system to an original time using the difference between the internal clock of the mobile device and the internal clock of the sale computer system, as stored in the first database.

7. The method of claim 6 further comprising:
  sending a search engine search request to the price comparison system, the search engine search request a function of the customer order;
  receiving the search engine search request, the search engine search request including a price associated with at least one good of the list of goods to be purchased;
  performing a search on a second database as a function of the search engine search request;
  returning pricing information of at least one product of a plurality of products associated with at least one retailer of a plurality of other retailers, the second database configured to store the pricing information associated with the plurality of products for the plurality of other retailers;
  comparing the price associated with the at least one good of the list of goods to be purchased and the pricing information of the at least one product of the plurality of products associated with the at least one retailer of the plurality of other retailers; and
  responsively establishing an amount of the credits associated with the at least one good of the list of goods to be purchased when a comparison of the price associated with the at least one good of the list of goods to be purchased and the pricing information of the at least one product of the plurality of products associated with the at least one retailer of the plurality of other retailers meets predefined criteria.

8. The method of claim 6 further comprising:
allowing the customer to scan each good of the list of goods to be purchased using a customer control unit associated with the customer; and
sending an identification of each good of the list of goods to be purchased and an associated price of each good of the list of goods to be purchased at the retailer to the price comparison system.

9. The method of claim 6 further comprising:
allowing the plurality of goods to be scanned prior to purchase; and
sending an identification of each good of the list of goods to be purchased and an associated price for each good of the list of goods to be purchased to the price comparison system through the network interface of the sale computer system.

10. The method of claim 6, wherein the customer orders through the network interface from a web site.

11. One or more non-transitory computer-readable storage media, having computer-executable instructions embodied thereon, wherein when executed by at least one processor, the computer-executable instructions cause the at least one processor to:
store, in a first database, a plurality of goods and a customer account associated with a customer of a retailer, the customer account including a customer identification number and a method of payment;
receive, at a sale computer system located at a delivery vehicle, a customer order associated with the customer, the customer order comprising:
a list of goods to be purchased;
the customer identification number; and
a total cost of the customer order;
emit a beacon signal from a network interface of the sale computer system, the beacon signal configured to pair the sale computer system with a mobile device associated with the customer;
receive, through the network interface of the sale computer system and from the mobile device associated with the customer, a pairing request comprising an encryption key and a time associated with an internal clock of the mobile device associated with the customer, the encryption key being randomly generated by the mobile device associated with the customer;
store, in the first database, the encryption key;
determine a difference between the internal clock of the mobile device associated with the customer and an internal clock of the sale computer system using the time associated with the internal clock of the mobile device associated with the customer and a time associated with the internal clock of the sale computer system;
store the difference between the internal clock of the mobile device associated with the customer and the internal clock of the sale computer system in the first database;
temporarily modify the internal clock of the sale computer system such that the internal clock of the sale computer system is synchronized with the internal clock of the mobile device associated with the customer using the difference between the internal clock of the mobile device and the internal clock of the sale computer system;
for each good of the list of goods to be purchased, send a price for each good of the list of goods to be purchased to a price comparison system;
receive an indication of a credit from the price comparison system through the network interface of the sale computer system, the credit being responsive to a difference between the price of each good of the list of goods to be purchased at the retailer and pricing information of each good of the list of goods to be purchased with at least one other retailer;
aggregate credits associated with each good of the list of goods to be purchased;
encrypt, using the at least one processor of the sale computer system and using the encryption key, the credits, as aggregated;
send, through the network interface of the sale computer system to a customer control device on the mobile device associated with the customer, a request to apply the credits, as aggregated and encrypted, to the customer order;
in response to the customer approving an application of the credits, as aggregated and encrypted, modify the total cost of the customer order as a function of the credits, as aggregated and encrypted;
receiving, at the network interface of the sale computer system, a predetermined piece of data encrypted using the encryption key and transmitted from the customer control device on the mobile device associated with the customer;
matching, using the at least one processor of the sale computer system, the predetermined piece of data encrypted using the encryption key with an unencrypted piece of predetermined data;
receive, via a barcode scanner associated with the sale computer system, data from a barcode displayed on the mobile device associated with the customer and scanned by the barcode scanner, the data from the barcode comprising:
the encryption key;
the time of the internal clock of the mobile device associated with the customer; and
the method of payment;
after completing the matching and when the time of the internal clock of the sale computer system, as modified, matches the time of the internal clock of the mobile device associated with the customer, authorize payment for the customer order using the method of payment; and
after authorizing payment, revert the internal clock of the sale computer system to an original time using the difference between the internal clock of the mobile device and the internal clock of the sale computer system, as stored in the first database.

12. The non-transitory computer-readable storage media of claim 11, wherein when executed by the at least one processor, the computer-executable instructions further cause the at least one processor to:
send a search engine search request to the price comparison system, the search engine search request a function of the customer order;
receive the search engine search request, the search engine search request including a price associated with at least one good of the list of goods to be purchased;

perform a search on a second database as a function of the search engine search request;

return pricing information of at least one product of a plurality of products associated with at least one retailer of a plurality of other retailers, the second database being configured to store the pricing information associated with the plurality of products for the plurality of other retailers;

compare the price associated with the at least one good of the list of goods to be purchased and the pricing information of the at least one product of the plurality of products associated with the at least one retailer of the plurality of other retailers; and responsively establish an amount of the credits associated with the at least one good of the list of goods to be purchased when a comparison of the price associated with the at least one good of the list of goods to be purchased and the pricing information of the at least one product of the plurality of products associated with the at least one retailer of the plurality of other retailers meets predefined criteria.

13. The non-transitory computer-readable storage media of claim 11, wherein when executed by the at least one processor, the computer-executable instructions further cause the at least one processor to:

allow the customer to scan a first good for purchase using the customer control device associated with the customer; and send an identification of the first good for purchase and an associated price of the first good for purchase at the retailer to the price comparison system.

14. The non-transitory computer-readable storage media of claim 11, wherein when executed by the at least one processor, the computer-executable instructions further cause the at least one processor to:

allow the plurality of goods to be scanned prior to purchase; and send an identification of each good of the list of goods to be purchased and an associated price for each good of the list of goods to be purchased to the price comparison system through the network interface.

15. The non-transitory computer-readable storage media of claim 11, wherein the customer order is received by the sale computer system through the network interface from a website.

16. The system of claim 1, wherein the method of payment comprises multiple payment methods.

17. The system of claim 1, wherein communication between the sale computer system and the mobile device associated with the customer is performed through vibratory signals.

18. The system of claim 1, wherein processing the customer order further comprises:

after completing the matching and when the time of the internal clock of the sale computer system, as modified, does not match the time of the internal clock of the mobile device associated with the customer, determining a difference between the internal clock of the sale computer system, as modified, and the internal clock of the mobile device associated with the customer; and when the difference between the internal clock of the sale computer system, as modified, and the internal clock of the mobile device associated with the customer is less than a predetermined amount of time, authorizing the payment for the customer order using the method of payment.

19. The method of claim 6 further comprising:

after completing the matching and when the time of the internal clock of the sale computer system, as modified, does not match the time of the internal clock of the mobile device associated with the customer, determining a difference between the internal clock of the sale computer system, as modified, and the internal clock of the mobile device associated with the customer; and when the difference between the internal clock of the sale computer system, as modified, and the internal clock of the mobile device associated with the customer is less than a predetermined amount of time, authorizing the payment for the customer order using the method of payment.

20. The non-transitory computer-readable storage media of claim 11, wherein when executed by the at least one processor, the computer-executable instructions further cause the at least one processor to:

after completing the matching and when the time of the internal clock of the sale computer system, as modified, does not match the time of the internal clock of the mobile device associated with the customer, determining a difference between the internal clock of the sale computer system, as modified, and the internal clock of the mobile device associated with the customer; and when the difference between the internal clock of the sale computer system, as modified, and the internal clock of the mobile device associated with the customer is less than a predetermined amount of time, authorizing the payment for the customer order using the method of payment.

* * * * *